(12) United States Patent
Nakamura et al.

(10) Patent No.: US 6,813,553 B2
(45) Date of Patent: Nov. 2, 2004

(54) COORDINATED BRAKE CONTROL SYSTEM

(75) Inventors: Hideo Nakamura, Yokohama (JP); Kazuhiko Tazoe, Kanagawa (JP); Hiroyuki Ashizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/649,945

(22) Filed: Aug. 28, 2003

(65) Prior Publication Data

US 2004/0054450 A1 Mar. 18, 2004

(30) Foreign Application Priority Data

Sep. 13, 2002 (JP) ........................................ 2002-268794
Mar. 4, 2003 (JP) ........................................ 2003-057299

(51) Int. Cl.[7] .............................................. G06G 7/76
(52) U.S. Cl. ........................... 701/70; 701/84; 303/112; 475/195
(58) Field of Search ............................ 701/22, 70, 79, 701/83, 84; 303/152, 155, 112; 188/126; 475/195; 477/92, 94, 182

(56) References Cited

U.S. PATENT DOCUMENTS

| 4,696,380 A | * | 9/1987 | Kita .......................... 192/221 |
| 5,727,856 A | * | 3/1998 | Kost et al. .................. 303/195 |
| 6,244,674 B1 | | 6/2001 | Kuno et al. |
| 6,270,172 B1 | * | 8/2001 | Shirai et al. ................ 303/152 |
| 6,354,672 B1 | * | 3/2002 | Nakamura et al. ....... 303/113.1 |
| 6,405,121 B2 | * | 6/2002 | Tamura et al. ................ 701/96 |
| 6,425,643 B2 | * | 7/2002 | Shirai et al. ................ 303/112 |

FOREIGN PATENT DOCUMENTS

| JP | 11-98609 A | 4/1999 |
| JP | 2001-16703 A | 1/2001 |

* cited by examiner

*Primary Examiner*—Gertrude A. Jeanglaude
(74) *Attorney, Agent, or Firm*—Foley & Lardner LLP

(57) ABSTRACT

A coordinated brake control system of a hybrid brake system is arranged to determine a total braking torque command value according to a vehicle operating condition, to distribute the total braking-torque command value to regenerative braking-torque command value and the hydraulic braking-torque command value, to calculate a reference model response value relative to a wheel-cylinder hydraulic pressure command value, on the basis of a braking force reference model taking account of a delay of the actual hydraulic pressure in the hydraulic control system relative to the wheel-cylinder hydraulic pressure command value, and to correct the regenerative braking-torque command value according to a braking torque control error between the estimated braking torque actual value and the reference model response value. The corrected regenerative braking-torque command value is employed in the control of the regenerative brake apparatus.

11 Claims, 15 Drawing Sheets

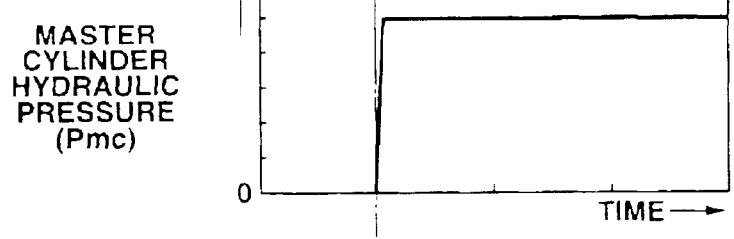
FIG.10A  MASTER CYLINDER HYDRAULIC PRESSURE (Pmc)
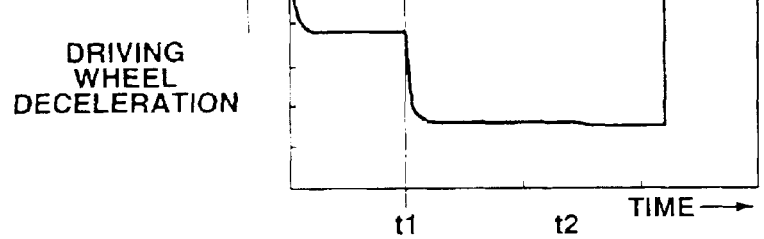
FIG.10B  DRIVING WHEEL DECELERATION
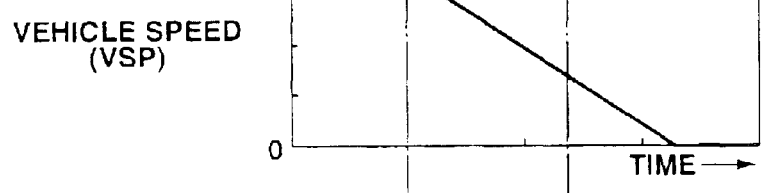
FIG.10C  VEHICLE SPEED (VSP)
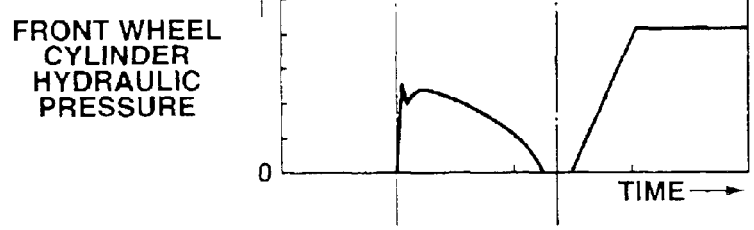
FIG.10D  FRONT WHEEL CYLINDER HYDRAULIC PRESSURE
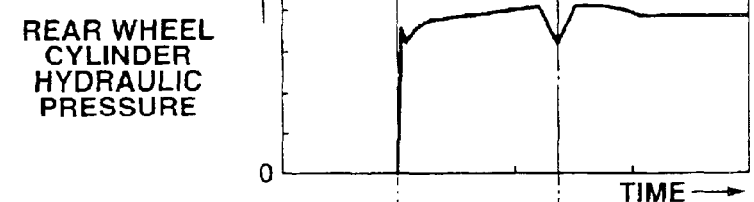
FIG.10E  REAR WHEEL CYLINDER HYDRAULIC PRESSURE
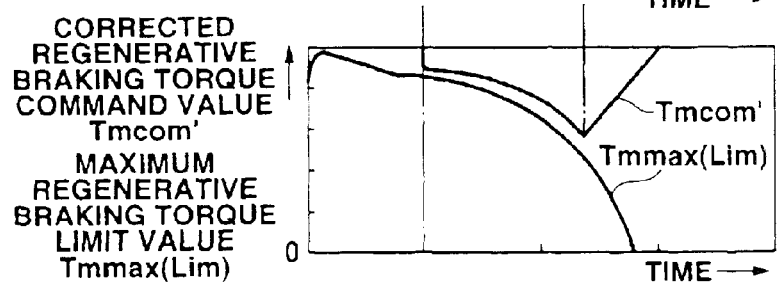
FIG.10F  CORRECTED REGENERATIVE BRAKING TORQUE COMMAND VALUE Tmcom' MAXIMUM REGENERATIVE BRAKING TORQUE LIMIT VALUE Tmmax(Lim)

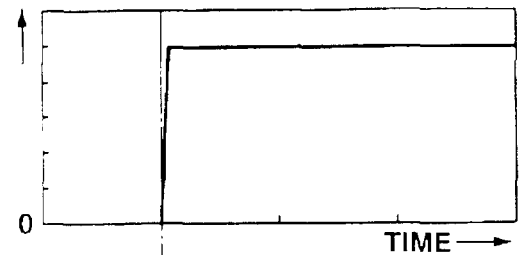
FIG.11A MASTER CYLINDER HYDRAULIC PRESSURE (Pmc)
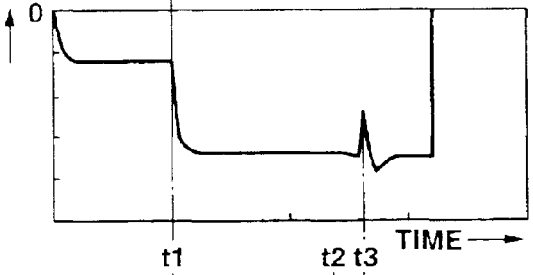
FIG.11B DRIVING WHEEL DECELERATION
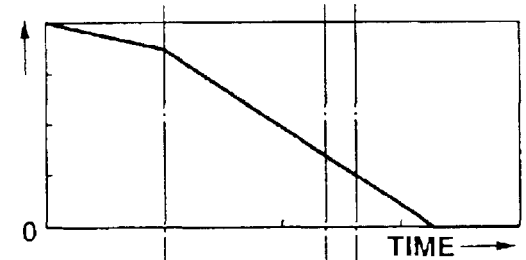
FIG.11C VEHICLE SPEED (VSP)
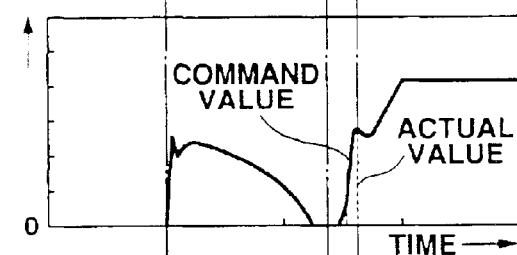
FIG.11D FRONT WHEEL CYLINDER HYDRAULIC PRESSURE
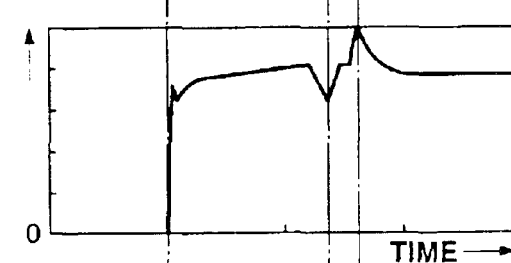
FIG.11E REAR WHEEL CYLINDER HYDRAULIC PRESSURE
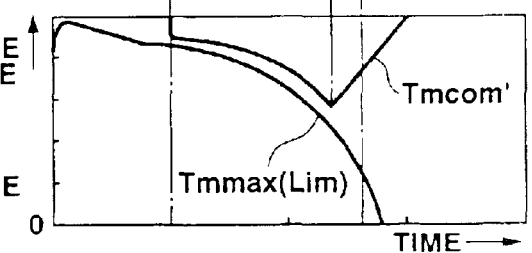
FIG.11F CORRECTED REGENERATIVE BRAKING TORQUE COMMAND VALUE Tmcom' MAXIMUM REGENERATIVE BRAKING TORQUE LIMIT VALUE Tmmax(Lim)

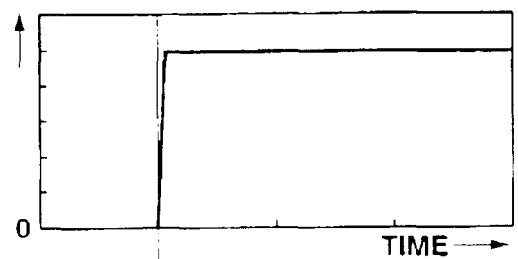
FIG.12A  MASTER CYLINDER HYDRAULIC PRESSURE (Pmc)
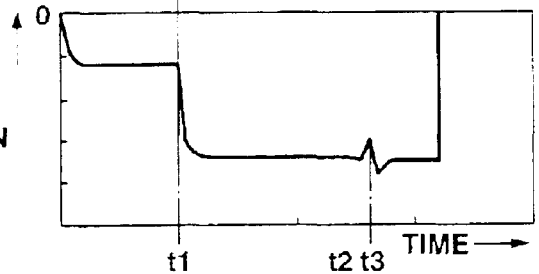
FIG.12B  DRIVING WHEEL DECELERATION
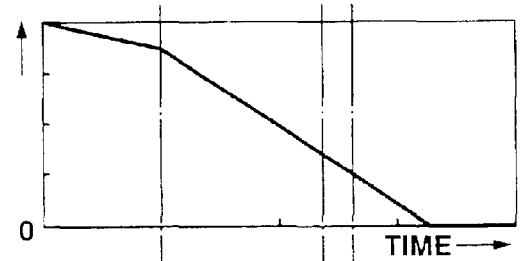
FIG.12C  VEHICLE SPEED (VSP)
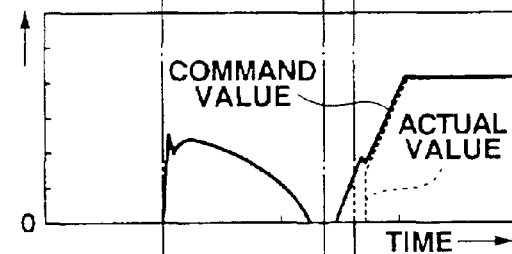
FIG.12D  FRONT WHEEL CYLINDER HYDRAULIC PRESSURE
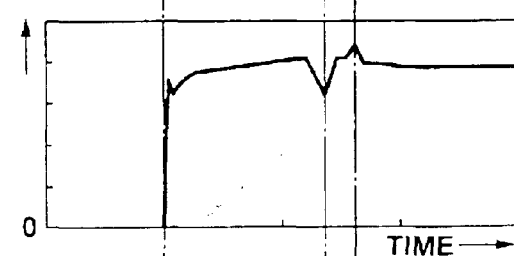
FIG.12E  REAR WHEEL CYLINDER HYDRAULIC PRESSURE
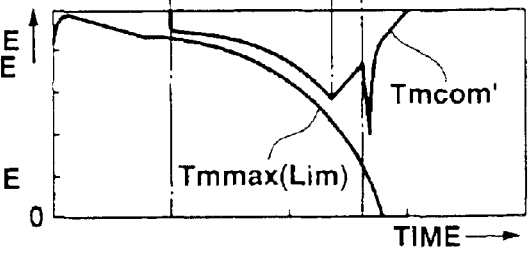
FIG.12F  CORRECTED REGENERATIVE BRAKING TORQUE COMMAND VALUE Tmcom'  MAXIMUM REGENERATIVE BRAKING TORQUE LIMIT VALUE Tmmax(Lim)

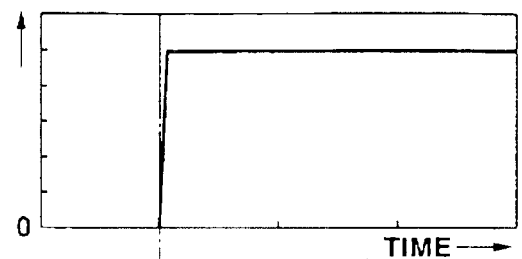
FIG.13A  MASTER CYLINDER HYDRAULIC PRESSURE (Pmc)
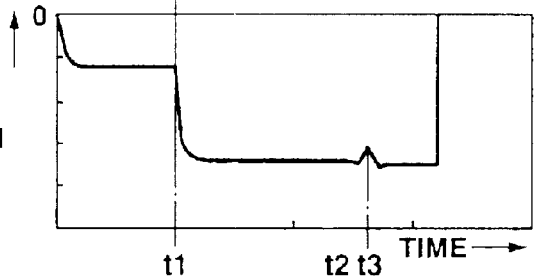
FIG.13B  DRIVING WHEEL DECELERATION
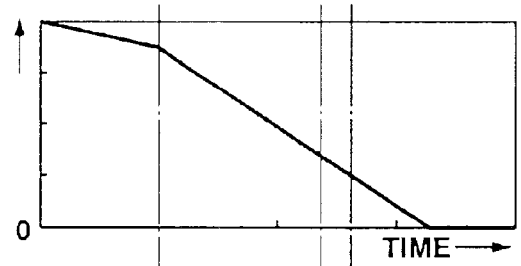
FIG.13C  VEHICLE SPEED (VSP)
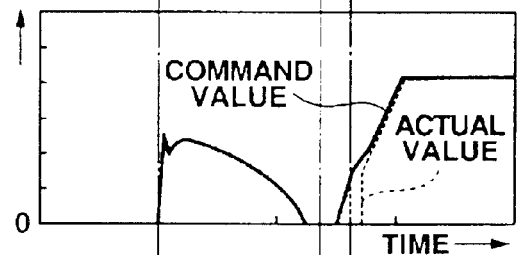
FIG.13D  FRONT WHEEL CYLINDER HYDRAULIC PRESSURE
FIG.13E  REAR WHEEL CYLINDER HYDRAULIC PRESSURE
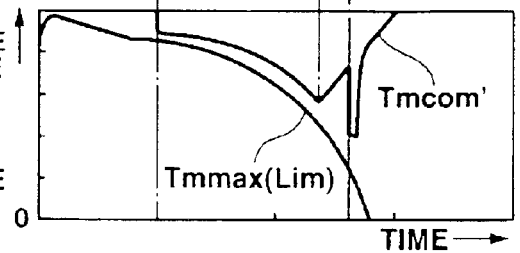
FIG.13F  CORRECTED REGENERATIVE BRAKING TORQUE COMMAND VALUE Tmcom'
MAXIMUM REGENERATIVE BRAKING TORQUE LIMIT VALUE Tmmax(Lim)

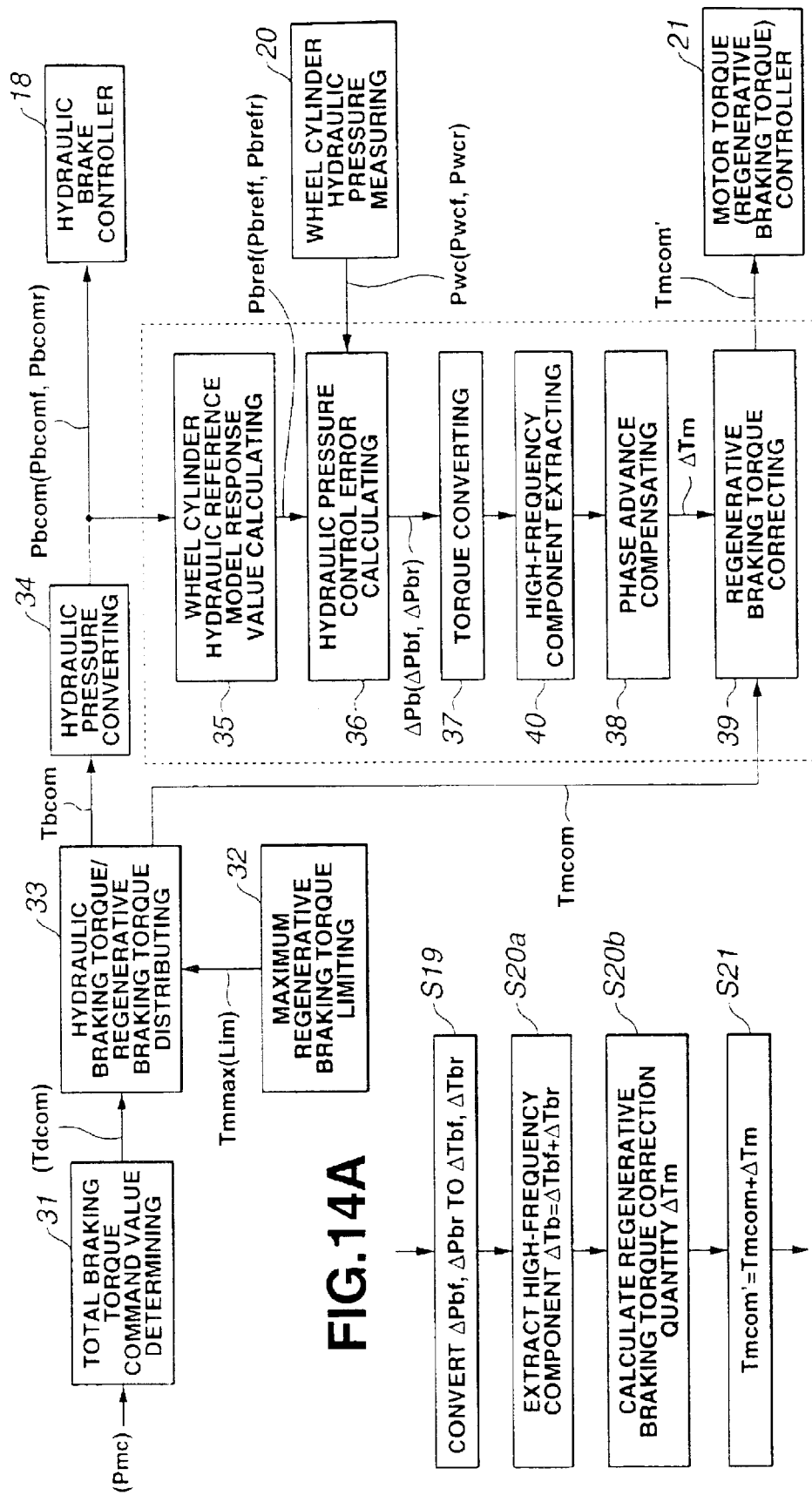

FIG.16B DECELERATION 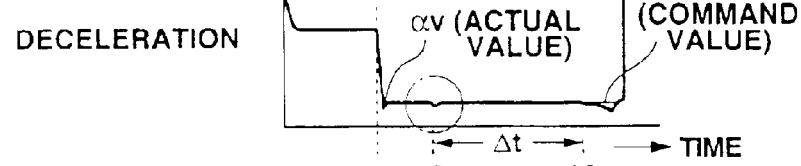

FIG.16F REGENERATIVE QUANTITY 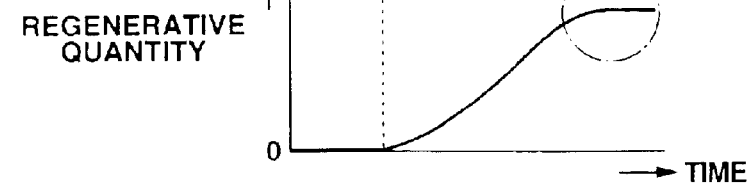

COORDINATED BRAKE CONTROL SYSTEM

BACKGROUND OF THE INVENTION

The present invention relates to a coordinated brake control system of a hybrid brake system having two kinds of brake apparatuses.

U.S. Pat. No. 6244674 (≈Japanese Patent Provisional Publication No. 11-98609) discloses a coordinated brake control system for controlling a hybrid brake system constructed by a regenerative brake apparatus and a hydraulic brake apparatus. This coordinated brake control system has been arranged to improve a fuel consumption by mainly operating the regenerative brake apparatus when a vehicle speed is higher than a predetermined vehicle speed and to decrease the regenerative braking torque while increasing the hydraulic braking torque as the vehicle speed is decreased. Further, a characteristic of the regenerative braking torque to be reduced is modified in response to a pressure difference between a master-cylinder hydraulic pressure and a wheel-cylinder hydraulic pressure so as to smoothly compensate for lack of the regenerative braking torque.

SUMMARY OF THE INVENTION

However, since this coordinated brake control system has been designed without taking account of a response delay of the hydraulic brake apparatus and a response delay of the regenerative brake apparatus, it is difficult to accurately control the hydraulic braking torque and the regenerative braking torque so as to accurately correspond the sum (total braking torque) of the regenerative braking torque and the hydraulic braking torque to a target total torque.

The applicant of the present invention has researched various methods for further smoothly varying a ratio between the regenerative braking torque and the hydraulic braking torque during a coordinated brake control while suppressing a fluctuation of the total braking torque actual value. Through the various researches, the inventors of the present invention have obtained a result that when a phase compensation is executed as to each of a hydraulic braking-torque command value and a regenerative braking-torque command value in addition to the control of U.S. Pat. No. 6,244,674, a fluctuation of the total braking torque actual value was not improved. The inventors have found that the pressure difference between the command value and the actual value of the wheel-cylinder hydraulic pressure includes an anticipated response delay, and this anticipated response delay has been already included in the phase compensation and is different from the control error and that even if the regenerative braking torque is directly corrected, a predetermined response delay will be generated until this correction is reflected in the actual regenerative braking torque.

Further, the inventors have reached a conclusion that the generation of the response delay is caused by correcting the regenerative braking-torque command value of a high-responsibility brake such as a regenerative brake apparatus on the basis of a difference between the command value and the actual value of the hydraulic braking torque, and that this problem is solved by correcting a regenerative braking-torque command value of a high-responsibility brake according to a difference between a reference model response value relative to the hydraulic braking-torque and an actual braking torque, where the reference model response value is obtained on the basis of a braking torque reference model which is determined upon taking account of a delay of a low-responsibility brake braking-torque relative to a torque command value of a low-responsibility brake such as a hydraulic brake apparatus.

It is therefore an object of the present invention to provide an improved coordinated brake control system which realizes the inventors' invention discussed above.

An aspect of the present invention resides in a coordinated brake control system for a hybrid brake system of a vehicle. The coordinated brake control system comprising: a vehicle operating condition detector detecting a vehicle operating condition of the vehicle; a first brake generating a first braking torque according to a first braking torque command value; a second brake generating a second braking torque according to a second braking torque command value, a control responsibility of the first brake being higher than a control responsibility of the second braking torque; and a controller connected to the vehicle operating condition detector, the first brake and the second brake, the controller being arranged, to determine a total braking torque command value according to the vehicle operating condition, to distribute the total braking torque command value into the first braking torque command value and the second braking torque command value, to estimate the second braking torque, to calculate a reference model response value relative to the second braking torque command value on the basis of a braking torque reference model which is determined upon taking account of a delay of the second braking torque relative to the second braking torque command value, and to correct the first braking torque command value according to a braking torque difference between the estimated second braking torque and the reference model response value.

Another aspect of the present invention resides in a method of controlling a hybrid brake system of a vehicle, the hybrid brake comprising a first brake and a second brake whose control responsibility is not higher than a control responsibility of the first brake, the method comprises an operation of detecting a vehicle operating condition of the vehicle; an operation of determining a total braking torque command value according to the vehicle operating condition; an operation of distributing the total braking torque command value into a first braking torque command value according which the first brake generates a first braking torque and a second braking torque command value according which the second brake generates a second braking torque; an operation of estimating the second braking torque; an operation of calculating a reference model response value relative to the second braking torque command value on the basis of a braking torque reference model which is determined upon taking account of a delay of the second braking torque relative to the second braking torque command value; and an operation of correcting the first braking torque command value according to a braking torque difference between the estimated second braking torque and the reference model response value.

The other objects and features of this invention will become understood from the following description with reference to the accompanying drawings.

BRIEF DESCRIPTION OF THE DRAWINGS

FIGS. 10A through 10F are time charts showing a coordinated control operation in case that wheel-cylinder hydraulic control error is around zero.

FIGS. 11A through 11F are time charts showing a coordinated control operation in case that the correction of the regenerative braking-torque command value and the phase advance compensation are not executed even when wheel-cylinder hydraulic control error is generated.

FIGS. 12A through 12F are time charts showing a coordinated control operation in case that the correction of the regenerative braking-torque command value is executed, and the phase advance compensation is not executed when wheel-cylinder hydraulic control error is generated.

FIGS. 13A through 13F are time charts showing a coordinated control operation in case that both of the correction of the regenerative braking-torque command value and the phase advance compensation are executed when wheel-cylinder hydraulic control error is generated.

FIG. 14A is a part of a flowchart showing a newly employed steps in the control program executed by the coordinated brake controller of a second embodiment according to the present invention, and FIG. 14B is a block diagram showing a control executed by the coordinated brake controller of the coordinated brake control system according to the second embodiment of the present invention.

FIGS. 16A through 16F are time charts showing a coordinated control operation of the hybrid brake system shown in FIG. 14B in case that the deceleration feedback control, the correction of the regenerative braking-torque command value, and the phase advance compensation are executed when wheel-cylinder hydraulic control error is generated.

DETAILED DESCRIPTION OF THE INVENTION

Referring to FIGS. 1 through 13F, there is discussed a first embodiment of a coordinated brake control system for a hybrid brake system in accordance with the present invention.

Figure 1:
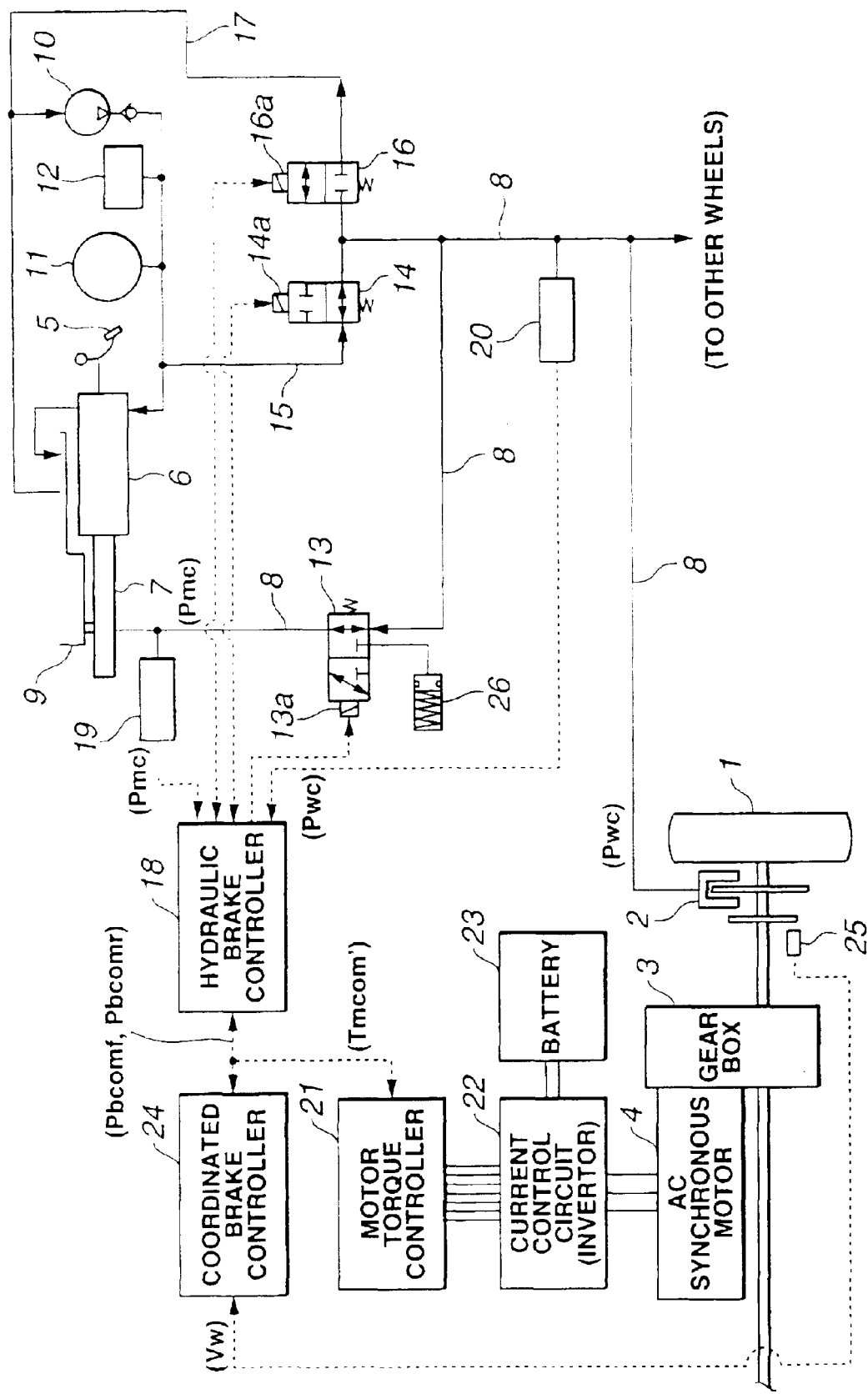
FIG. 1 is a schematic view showing a complex brake provided with a coordinated brake control system according to a first embodiment of the present invention.

FIG. 1 shows the hybrid brake system comprising the coordinated brake control system according to the first embodiment of the present invention. The hybrid brake system comprises a hydraulic brake apparatus of generating a braking force by supplying a hydraulic pressure to a wheel cylinder 2 provided for each driving wheel 1 (in FIG. 1, only one wheel is shown), and a regenerative brake apparatus of converting a wheel rotating energy into an electric power by means of an alternating-current (AC) synchronous motor 4 which is connected to driving wheel 1 through a gear box 3.

The coordinated brake control system of the hybrid brake system is arranged to effectively recover a regenerative energy by decreasing a braking hydraulic pressure to wheel cylinder 2 during when the barking torque (force) is mainly produced (covered) by the regenerative braking torque using AC synchronous motor 4.

First, there is discussed the hydraulic brake apparatus which does not exceed in response characteristic as compared with a regenerative brake apparatus. When a brake pedal 5 is depressed according to the driver's braking intent, a depression force of brake pedal 5 is amplified by a hydraulic booster 6. The amplified depression force pushes a piston cup of a master cylinder 7, and therefore mater cylinder 7 outputs a master-cylinder hydraulic pressure Pmc corresponding to the depression force of brake pedal 5 toward a brake hydraulic conduit 8. Although FIG. 1 shows that brake hydraulic conduit 8 is connected only to wheel cylinder 2 of front drive wheel 1, it is of course that brake hydraulic conduit 8 is connected to other wheel cylinders of other three wheels.

Brake fluid in a reservoir 9 is commonly used by hydraulic booster 6 and master cylinder 7 and serves as working fluid. Hydraulic booster 6 comprises a pump 10 which sucks brake fluid from reservoir 9 and discharges the brake fluid toward an accumulator 11 to store the pressurized working fluid in accumulator 11. Further, the hydraulic pressure in accumulator 11 is controlled by a sequential control using a pressure sensor 12 provided in a conduit between pump 19 and accumulator 11.

Hydraulic booster 6 amplifies the depression force applied to brake pedal 5 using the hydraulic pressure in accumulator 11 as a pressure source, and presses the piston cup of mater cylinder 7 by mean of the amplified depression force. Master cylinder 7 generates master-cylinder hydraulic pressure Pmc corresponding to the brake pedal depression force by pressingly packing (containing) the brake fluid supplied from reservoir 9 in brake conduit 8, and supplies wheel-cylinder hydraulic pressure Pwc to wheel cylinder 2 as a base pressure.

Wheel-cylinder hydraulic pressure Pwc is feedback controlled using the accumulator pressure in accumulator 11, as discussed later. In order to achieve this feedback control, an electromagnetic selector valve 13 is provided in brake hydraulic conduit 8, and a pressure increasing circuit 15 and a pressure decreasing circuit 17 are connected to a brake hydraulic conduit 8 at a position nearer to wheel cylinder 2 as compared with the position of electromagnetic selector valve 13. Pressure increasing circuit 15 extends from a discharging port of pump 10 and comprises a pressure increasing valve 14. Pressure decreasing circuit 17 extends from a suction port of pump 10 and comprises a pressure decreasing valve 16.

Electromagnetic selector valve 13 is a normal open valve, and therefore master-cylinder hydraulic pressure Pwc is increased by the pressure of accumulator 11 which is produced by the fluid communication with pressure increasing circuit 15 when electromagnetic selector value 13 is in an off state corresponding to a normal open state. When a solenoid 13a of electromagnetic selector valve 13 is energized to close brake hydraulic circuit 8, master cylinder 7 is simultaneously communicated with a stroke simulator 26 to apply a hydraulic load corresponding (equal) to that of wheel cylinders 2 to master cylinder 7. This communication with stroke simulator 26 applies an operation feeling as same as that at the normal state to brake pedal 5.

Pressure increasing valve 14 is also a normal open valve and increases wheel-cylinder hydraulic pressure Pwc using the pressure of accumulator 11 (by the communication with pressure increasing circuit 15 ) when put in the norm open state (de-energized). On the other hand, when a solenoid 14 a of pressure increasing valve 14 is energized, increase of wheel-cylinder hydraulic pressure Pwc is stopped by shutting off the communication between brake hydraulic conduit 8 and pressure increasing circuit 15. Pressure decreasing valve 16 is a normal close valve which is closed when a solenoid 16 a is de-energized. When solenoid 16 a is energized, pressure decreasing circuit 16 is communicated with brake hydraulic conduit 8 so as to decrease wheel-cylinder hydraulic pressure Pwc.

Pressure increasing valve 14 and pressure increasing valve 16 are put in closed state so that pressure increasing circuit 15 and pressure decreasing circuit 17 are shut off from brake hydraulic conduit 8, during when electromagnetic selector valve 13 is put in an open state so as to open brake hydraulic conduit 8. Therefore, wheel-cylinder hydraulic pressure Pwc is determined from master-cylinder hydraulic pressure Pmc. Further, during when wheel-cylinder hydraulic pressure Pwc is increased or decreased by operating pressure increasing valve 14 or pressure decreasing valve 16, electromagnetic selector valve 13 is being turned on to shut off brake hydraulic conduit 8 so as not to be affected by master-cylinder hydraulic pressure Pmc.

Hydraulic brake controller 18 controls electromagnetic selector valve 13, pressure increasing valve 14 and pressure decreasing valve 16. Hydraulic brake controller 18 receives a signal indicative of master-cylinder hydraulic pressure Pmc from a pressure sensor 19 and a signal indicative of wheel-cylinder hydraulic pressure Pwc from a pressure sensor 20. Master-cylinder hydraulic pressure Pmc represents a braking torque (force) demanded by a driver, and wheel-cylinder hydraulic pressure Pwc represents an actual value of a hydraulic braking torque.

AC synchronous motor 4 is drivingly connected to each driving wheel 1 through gear box 3, and is controlled by a motor torque controller 21. Motor torque controller 21 outputs three-phase PWM signal, and inverter (DC-AC inverting current control circuit) 22 inverts DC into AC and supplies the inverted AC to AC synchronous motor 4. When a driving torque (driving force) by motor 4 is required, driving wheels 1 are driven by an electric power from a DC battery 23. When a braking torque (braking force) by motor 4 is required, a vehicle motion energy is recovered in battery 23 by executing a regenerative braking torque control.

As shown in FIG. 1, a hydraulic brake controller 18 and a motor torque controller 21 are networked with a coordinated brake controller 24. Hydraulic brake controller 18 controls the hydraulic brake apparatus according to the command signal from coordinated brake controller 24, and motor torque controller 21 controls the regenerative braking control apparatus according to the command signal from coordinated brake controller 24. More specifically, motor torque controller 21 controls a regenerative brake torque generated by motor 4 on the basis of a regenerative braking-torque command value outputted from coordination controller 24. When driving of driving wheels 1 is required, motor torque controller 21 executes the driving torque control using motor 4. Further, motor torque controller 21 calculates an allowable maximum regenerative braking torque of motor 4, which is determined based on a charged state and a temperature of battery 23, and outputs a signal corresponding to the allowable maximum regenerative braking torque to coordinated brake controller 24.

Coordinated brake controller 24 receives the signal indicative of master-cylinder hydraulic pressure Pmc from pressure sensor 19 through hydraulic brake controller 18, the signal indicative of wheel-cylinder hydraulic pressure Pwc from pressure sensor 20 through hydraulic brake controller 18, and a signal indicative of a wheel speed Vw of driving wheels 1 from wheel speed sensors 25.

Figure 2:
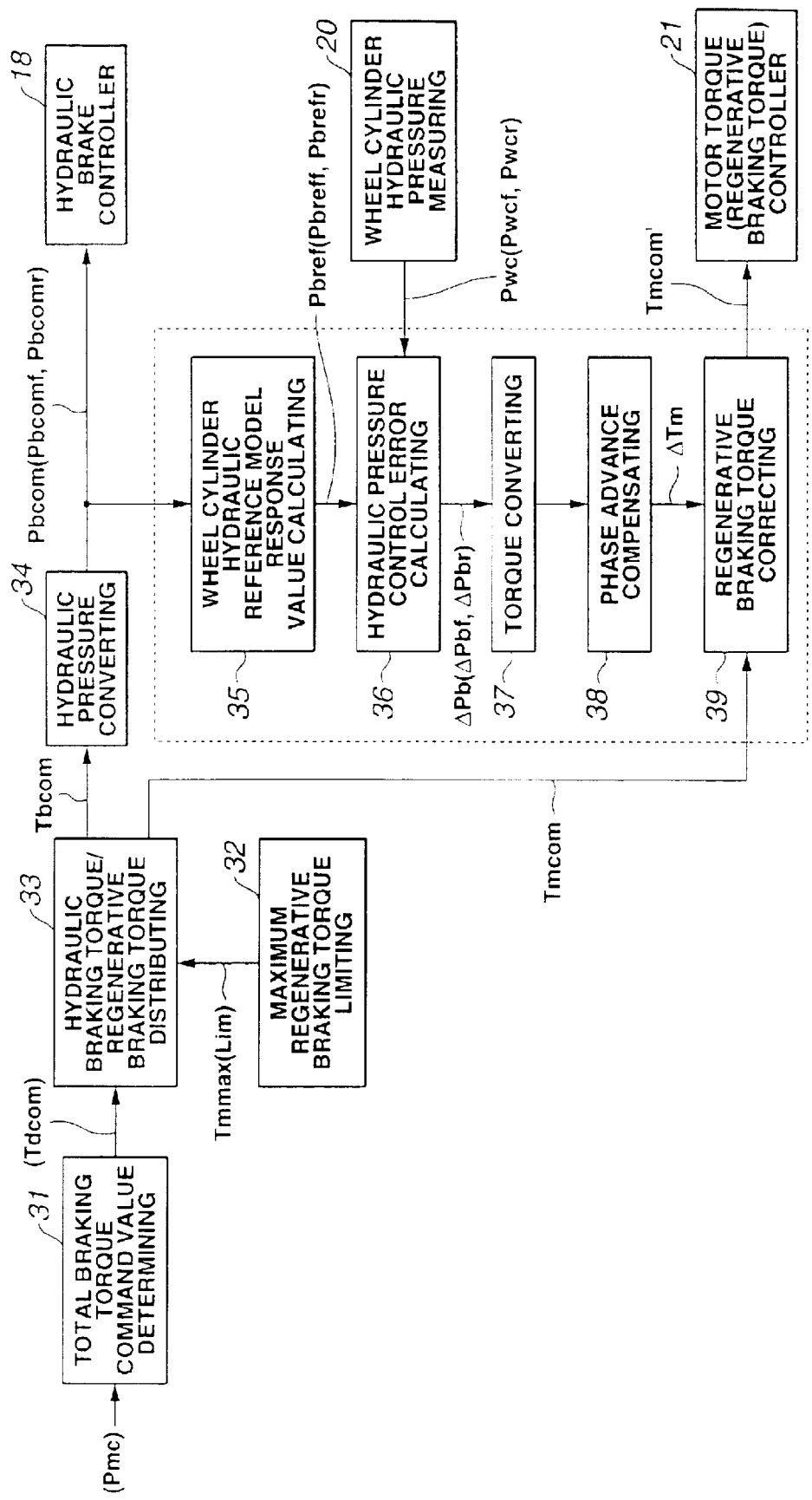
FIG. 2 is a block diagram showing controls executed by a coordinated brake controller of the coordinated brake control system shown in FIG. 1.
Figure 3:
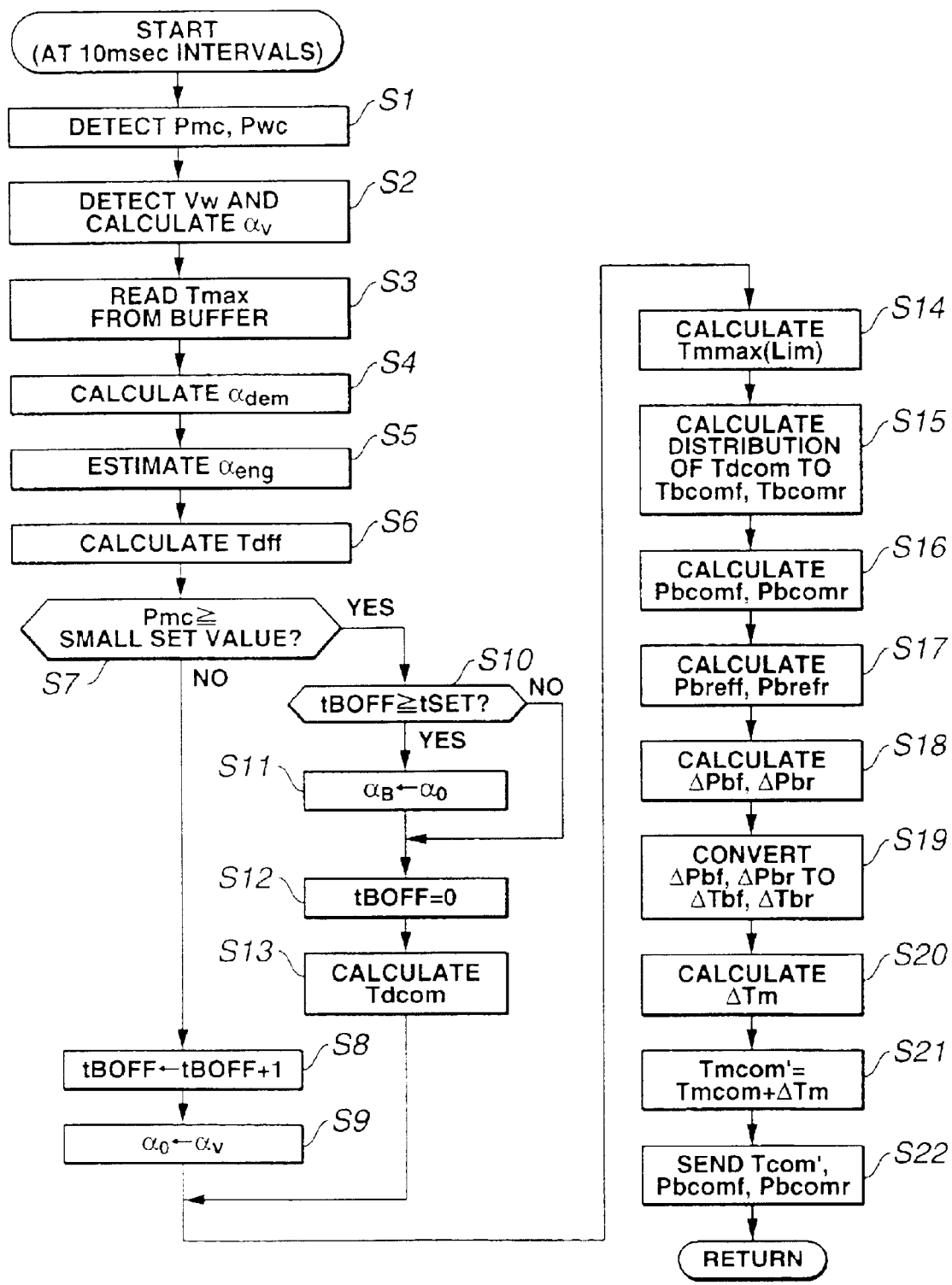
FIG. 3 is a flowchart showing a control program executed by the coordinated brake controller.

Coordinated brake controller 24 executes a coordination control of the hybrid brake system by executing a processing based on the above input information, as shown by a block diagram in FIG. 2 and a flowchart in FIG. 3. FIG. 3 is a timer interruption processing executed at 10 msec intervals.

At step S1 controller 24 calculates (measures) master-cylinder hydraulic pressure Pmc and wheel-cylinder hydraulic pressure Pwc from the received information.

At step S2 controller 24 calculates a driving wheel speed Vw based on the received signal indicative of driving wheel speed Vw. Further, controller 24 calculates a driving-wheel deceleration $\alpha_V$ by executing a filtering processing of driving wheel speed Vw using a band-pass filter represented by the following transfer function Fbpf(s).

$$Fbpf(s)=1/\{(1/\omega^2)s^2+(2\zeta/\omega)s+1\} \quad (1)$$

where s is Laplace operator. Actually, driving-wheel deceleration $\alpha_V$ is calculated using a recurrence formula obtained by discretizing the transfer function expressed by the expression (1) with Tustin (Biliner) approximation.

Figure 7:
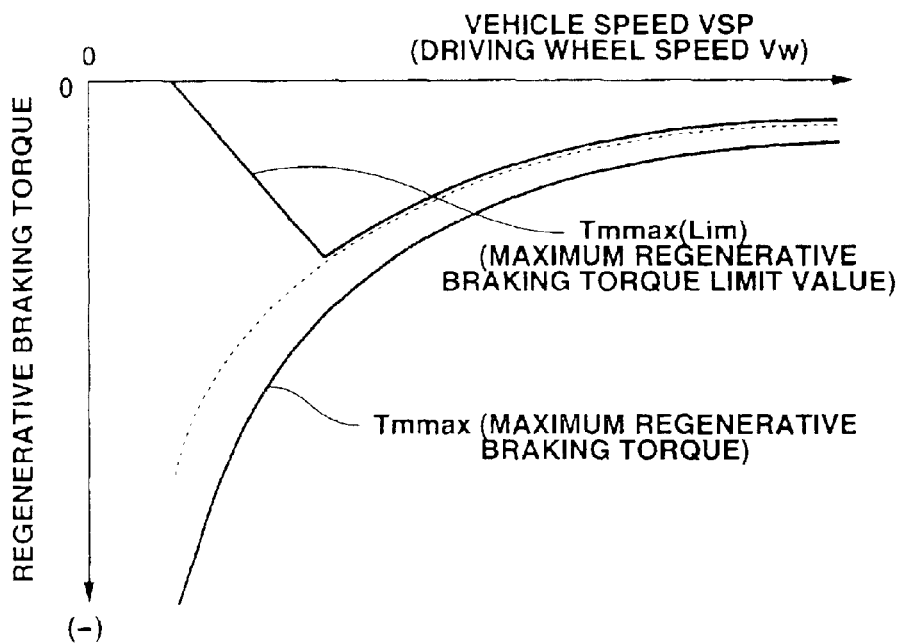
FIG. 7 is a graph showing an allowable maximum value and a maximum limit value of a regenerative braking torque relative to the vehicle speed.

At step S3 controller 24 reads a maximum regenerative braking torque Tmmax, which motor 4 is capable of generating, from a high-speed communication buffer between controller 24 and motor torque controller 21. As discussed above, motor torque controller 21 calculates maximum regenerative braking torque Tmmax according to a charged state of battery 23 and the like. For example, maximum regenerative braking torque Tmmax (driving wheel speed Vw) is varied according to vehicle speed VSP as shown in FIG. 7.

At step S4 controller 24 calculates a target deceleration $\alpha_{dem}$ of the vehicle using following expression (2), master-cylinder hydraulic pressure Pmc and a constant K1 which is determined according to vehicle specifications previously stored in ROM of controller 24.

$$\alpha_{dem}=-(Pmc \times K1) \quad (2)$$

where a negative value of acceleration a is a deceleration, and a negative value of torque T is a braking torque.

Target deceleration $\alpha_{dem}$ is not determined only by master-cylinder hydraulic pressure Pmc, which is a physical quantity demanded by a driver. For example, if the vehicle is equipped with an inter-vehicle distance control system and/or a cruise control system, target deceleration $\alpha_{dem}$ is determined upon taking account of a physical quantity of an automatic braking executed by the inter-vehicle distance control system and/or the cruise control system.

At step S5 controller 24 estimates a vehicle deceleration (engine brake deceleration) $\alpha_{eng}$ which is produced only by the negative driving force generated when the accelerator pedal is released, that is, by an engine brake force.

Figure 4:
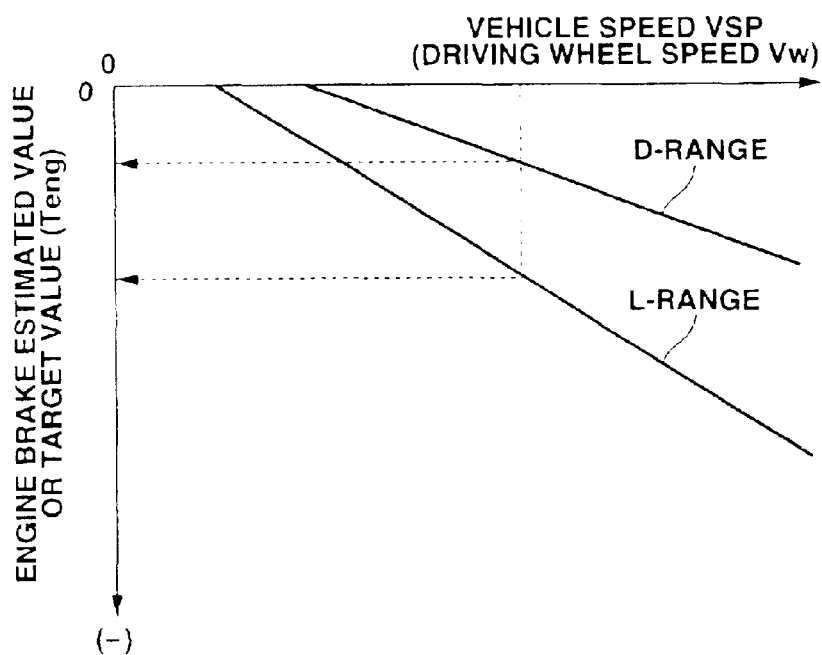
FIG. 4 is a graph showing a characteristic of an engine braking force relative to a vehicle speed when an accelerator pedal is released.
Figure 5:
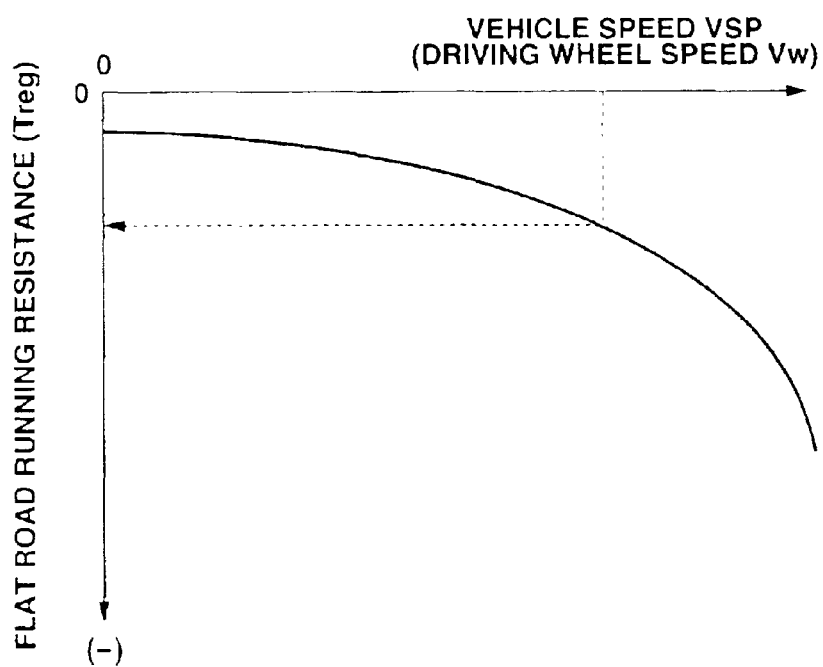
FIG. 5 is a graph showing a flat road running resistance relative to the vehicle speed.

More specifically, controller 24 retrieves an engine brake force estimated value (target engine brake force) Teng from a map shown in FIG. 4, which has been previously stored in ROM of controller 24, according to vehicle speed VSP (driving wheel speed Vw) and a selected range (D-range or L-range) of an automatic transmission. Further, controller 24 retrieves a flat-road running resistance Treg from a map shown in FIG. 5, which has been previously stored in ROM of controller 24, according to vehicle speed VSP (driving wheel speed Vw). Furthermore, controller 24 calculates engine brake deceleration estimated value αeng, which is an average value on a flat road, by dividing the sum of engine brake force estimated value Teng and flat-road running resistance Treg by a vehicle weight Mv as shown by the following expression (3).

$$\alpha_{eng} = (Teng + Treg)/Mv \quad (3)$$

At step S6 controller 24 calculates a braking-torque command value Tdff (a feedforward compensation quantity), which is necessary to realize target deceleration $\alpha_{dem}$ by the following manner. That is, controller 24 converts target deceleration $\alpha_{dem}$ to the braking torque using constant K2 determined from the vehicle specifications. Subsequently, braking-torque command value Tdff (feedforward compensation quantity) for target deceleration $\alpha_{dem}$ is obtained by filtering the braking torque corresponding to target deceleration $\alpha_{dem}$ through a characteristic $C_{FF}(s)$ of feedforward compensator (phase compensator) 51, which is represented by the following in expression (4) and functions to correspond a response characteristic Pm(s) of a controlled object (vehicle) 54 to a characteristic Fref(s) of a reference model 52 in FIG. 6. Actually, braking-torque command value Tdff (feedforward compensation quantity) for target deceleration $\alpha_{dem}$ is calculated by discretizing the expression (4) as is the same manner discussed above.

$$G_{FF}(s) = Fref(s)/Pm(s) \quad (4)$$
$$= (Tp \cdot s + 1)/(Tr \cdot s + 1) \quad (5)$$

where Tp is a time constant, and Tr is also a time constant.

At step S7 controller 24 determines whether or not a brake pedal operation is executed, by determining whether or not master-cylinder hydraulic pressure Pmc is greater than or equal to a small set value. When the determination at step S7 is affirmative, that is, when the brake pedal operation is executed, the program proceeds to step S10 wherein controller 24 determines whether or not a condition of no brake-pedal operation is continued for more than preset time tSET by determining whether or not timer tBOFF is greater than or equal to set time tSET.

When the determination at step S10 is affirmative (tBOFF≧tSET), that is, when the condition of no brake pedal operation continues for more than preset time tSET, the program proceeds to step S11 wherein controller 24 updates deceleration reference value $\alpha_B$ to deceleration $\alpha_0$. When the determination at step S10 is negative, that is, when the condition of no brake pedal operation is not continued for more than preset time tSET, the program jumps to step S12 wherein controller 24 resets timer tBOFF at zero (tBOFF=0).

At step S13 controller 24 calculates a total braking-torque command value necessary to achieving target deceleration $\alpha_{dem}$ by the following manner.

Figure 6:
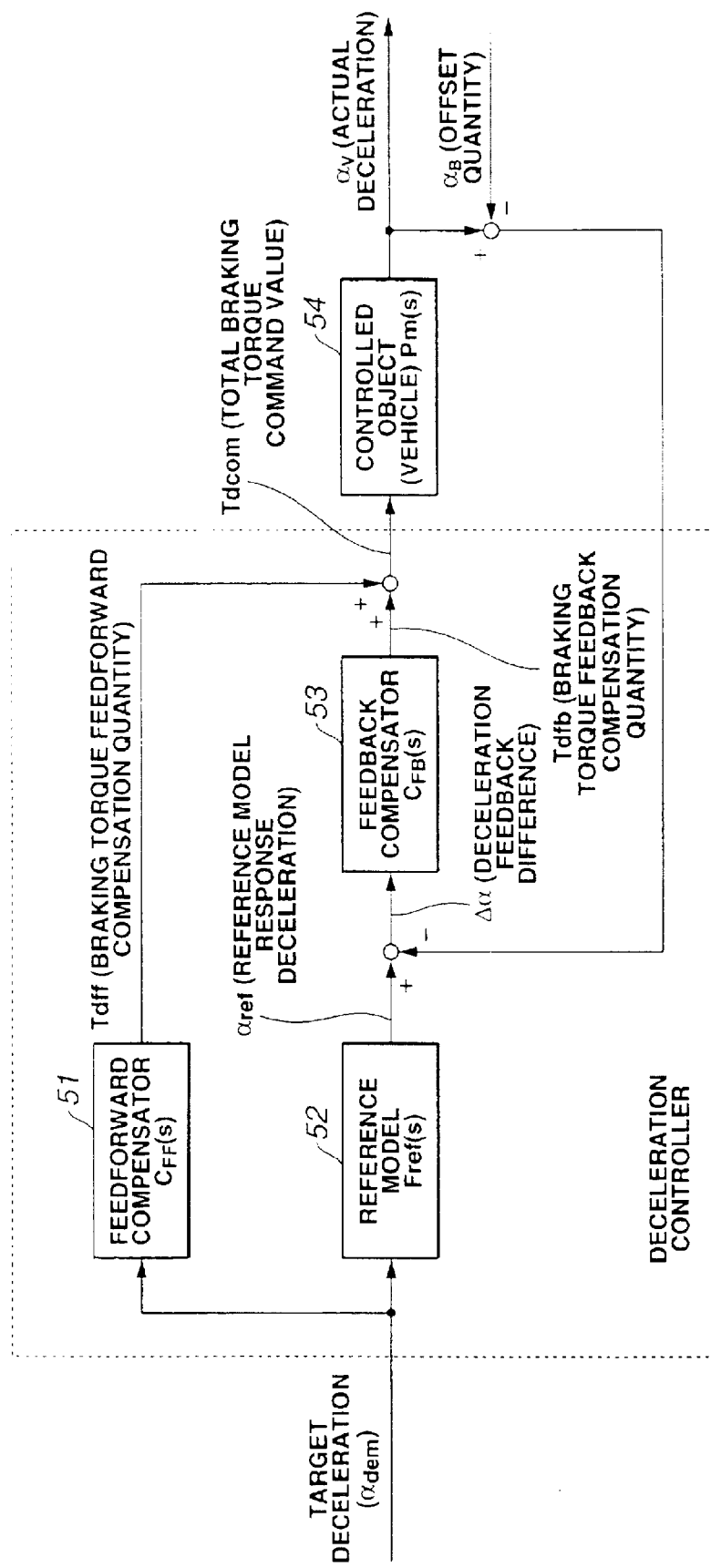
FIG. 6 is a block diagram showing a deceleration controller employed in the first embodiment of the present invention.

A deceleration controller employed in the first embodiment according to the present invention is constructed by a two-degree-of-freedom control system, and comprises feedforward compensator 51, reference model 52 and feedback compensator 53 as shown in FIG. 6. Feedback compensator 53 achieves a close-loop performance such as the stability and the robustness of the control system, and feedforward compensator 51 achieves a responsibility to target deceleration $\alpha_{dem}$ as far as there is no model error.

In calculation of a braking-torque feedback compensation quantity Tdfb, reference model response deceleration $\alpha_{dem}$ is first obtained by filtering target deceleration $\alpha_{dem}$ through a reference model having a characteristic Fref(s) represented by the following expression (6).

$$Fref(s) = 1/(Tr \cdot s + 1) \quad (6)$$

Further, as shown in FIG. 6, a deceleration feedback difference Δα is obtained by subtracting a difference ($\alpha_V - \alpha_B$) of an actual deceleration $\alpha_V$ and an offset quantity $\alpha_B$ from reference model response deceleration $\alpha_{ref}$, as follows.

$$\Delta\alpha = \alpha_{ref} - (\alpha_V - \alpha_B) \quad (7)$$

Furthermore, braking torque compensation quantity Tdfb is obtained by filtering deceleration feedback difference Δα through feedback compensator 53 having a characteristic $C_{FB}(s)$ represented by the following expression (8).

$$C_{FB}(s) = (Kp \cdot s + Ki)/s \quad (8).$$

In this first embodiment, this characteristic is achieved by a basic PI controller, and therefore control constants $K_P$ and $K_I$ thereof are determined upon taking account of a gain margin and a phase margin. Further, characteristics Fref(s) and $C_{FB}(s)$ are obtained by discretizing the expressions (6) and (8) as is the same manner discussed above.

Subsequently, total braking-torque command value Tdcom is obtained by summing braking-torque command value Tdff (feedforward compensation quantity) for target deceleration $\alpha_{dem}$ and braking torque feedback compensation quantity Tdfb (Tdcom=Tdff+Tdfb), as shown in FIG. 6. With this series of executions at step S13, total braking-torque command value Tdcom is obtained. Therefore, step S13 in FIG. 3 corresponds to total braking-force command value determining means 31 in FIG. 2.

At step S14 subsequent to the execution of step S13 or S9, controller 24 calculates a maximum regenerative braking torque limit value Tmmax(Lim) by executing a limiting operation of maximum regenerative braking torque Tmmax as follows.

First, in order to ensure a margin for enabling the correction (plus and minus correction) of regenerating braking torque based on the wheel-cylinder hydraulic pressure control error, limit value Tmmax(Lim) of the maximum regenerative braking torque is set at 80% of maximum regenerative braking torque Tmmax (Tmmax(Lim)=0.8×Tmmax), as shown by a broken line in FIG. 7.

Further, in order to accomplish the regenerative coordinated brake control by smoothly varying a weighted ratio state of the regenerative braking and the hydraulic braking from a regenerative braking weighted state to a hydraulic braking weighted state, limit value Tmmax(Lim) of the maximum regenerative braking torque is set at a value represented by a bold line in FIG. 7 so as to gradually decrease a magnitude of limit value Tmmax(Lim) toward zero as vehicle speed VSP (driving wheel speed Vw) decreases and to finally take zero, as shown in FIG. 7. Therefore, step S14 in FIG. 3 corresponds to maximum regenerative braking torque limiting means 32 in FIG. 2.

At step S15 controller 24 distributes total braking-torque command value Tdcom for regenerative coordination brake control into regenerative braking toque command Tmcom and hydraulic braking-torque command value Tbcom, based on maximum regenerative braking torque limit value Tmmax(Lim). Therefore, step S15 corresponds to distributing hydraulic braking torque and regenerative braking torque means 33 in FIG. 2.

In this first embodiment according to the present invention, the distribution thereof is executed so that regenerative braking toque command Tmcom takes maximum regenerative braking torque limit value Tmmax(Lim) as possible, that is,
so as to consume maximum regenerative braking torque limit value Tmmax(Lim) as possible. Further, hydraulic braking-torque command value Tbcom is distributed to the front wheel (driving wheel) side and the rear wheel (driven wheel) side. Further, since the first embodiment has been shown and described such that motor 4 for regenerative braking is provided only to front wheels 1 acting as driving wheels, there are occurred Mode 1 and Mode 2 where normal front and rear braking-torque distribution is maintained and Mode 3 and Mode 4 where normal front and rear distribution of braking torque cannot be maintained.

Figure 8:
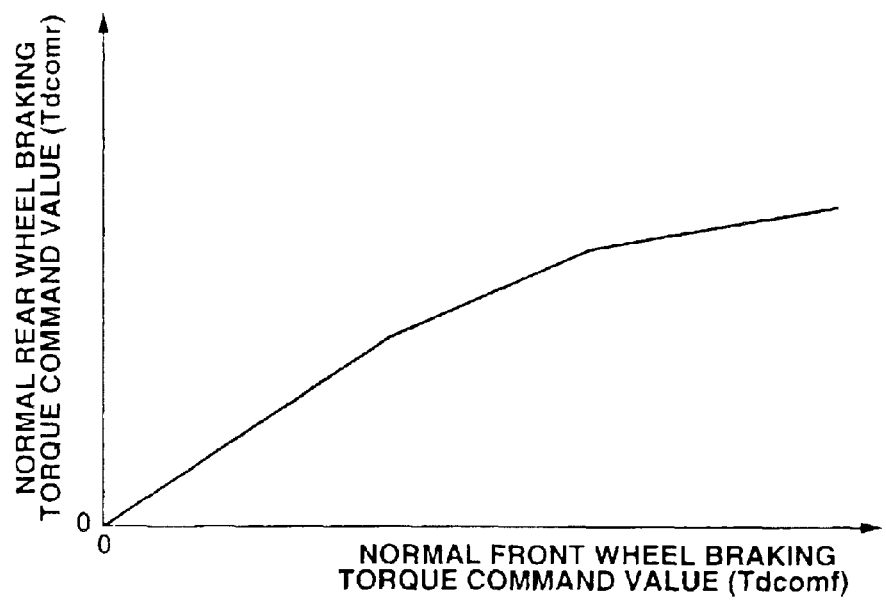
FIG. 8 is a graph showing a normal distribution characteristic of the braking torque to front and rear wheels.

First, normal front-wheel braking-torque command value Tdcomf and the normal rear-wheel braking-torque command value Tdcomr are obtained by normally distributing total braking-torque command value Tdcom to the front wheel side and the rear wheel side on the basis of the map data shown in FIG. 8 which has been previously stored in ROM of controller 24. The normal front and rear braking torque distribution is a front and rear braking force (torque) distribution characteristic which is a reference value when the regenerative braking is not executed, and has been determined upon taking account of the rear-wheel lock avoidance, the stability of the vehicle behavior, and the shortening of the braking distance which are caused by the weight movement between front and rear wheels during the braking operation.

Hereinafter, the regenerative coordination braking control by each Mode as follows.

Mode 4

When Tmmax(Lim)≦(Tdcomf+Tdcomr), only the regenerative braking is employed as expressed by the following expressions (9A):

Tbcomf=0,

Tbcomr=0, and $$Tmcom=Tdcomf+Tdcomr. \quad (9A)$$

Mode 3

When Tmmax(Lim)≦Tdcomf, the regenerative braking and the rear wheel hydraulic braking are employed as expressed by the following expressions (9B):

Tbcomf=0

Tbcomr=Tdcomf+Tdcomr−Tmmax(Lim)

and $$Tmcom=Tmmax(Lim). \quad (9B)$$

Mode 2

When Tdcomf<Tmmax(Lim)≦small set value, the regenerative braking and the front and rear wheel hydraulic braking are employed as expressed by the following expressions (9C):

Tbcomf=Tdcomf−Tmmax(Lim),

Tbcomr=Tdcomr, and $$Tmcom=Tmmax(Lim). \quad (9C)$$

Mode 1

When other case except the above Modes 4, 3 and 2, only the front and rear hydraulic braking is employed as expressed by the following expressions (9D):

Tbcomf=Tdcomf,

Tbcomr=Tdcomr, and $$Tmcom=0. \quad (9D)$$

At step S16 controller 24 calculates wheel-cylinder hydraulic pressure command values Pbcomf and Pbcomr for front and rear wheels using a constant K3 on the basis of front and rear wheel hydraulic braking toque command values Tbcomf and Tbcomr, as follows.

Pbcomf=−(Tbcomf×K3)

$$Pbcomr=-(Tbcomr \times K3) \quad (10)$$

where K3 is the constant determined from the vehicle specifications previously stored in ROM.

At step S17 controller 24 calculates reference model response values Pbreff and Pbrefr of front and rear wheel-cylinder hydraulic command values Pbcomf and Pbcomr. The reference model response is a reference model response employed when hydraulic brake controller 18 shown in FIG. 1 executes the feedback control of the front and rear wheel-cylinder hydraulic pressures. This reference model response is designed such that the hydraulic pressure actual value corresponds to the reference model response having a predetermined delay relative to the hydraulic command value. The reference model response may be designed by other method except for the feedback control method, and may be designed such that as a result a special responsibility relative to a command value of a hydraulic servo system achieves the characteristic of the control system.

A reference characteristic Frefb(s) of the hydraulic servo system is, for example, represented by the following expression (11).

$$Frefb(s)=1/(Tbrefes+1) \quad (11)$$

where Tbref is a time constant, characteristic Frefb(s) is obtained by discretizing the expression (11) as is the same manner discussed above, and reference model response values Pbreff and Pbrefr for front and rear wheel-cylinder hydraulic command values Pbcomf and Pbcomr are also obtained by the same manner. Step S17 therefore corresponds to wheel-cylinder hydraulic reference model response value calculating means 35 in FIG. 2.

Figure 9:
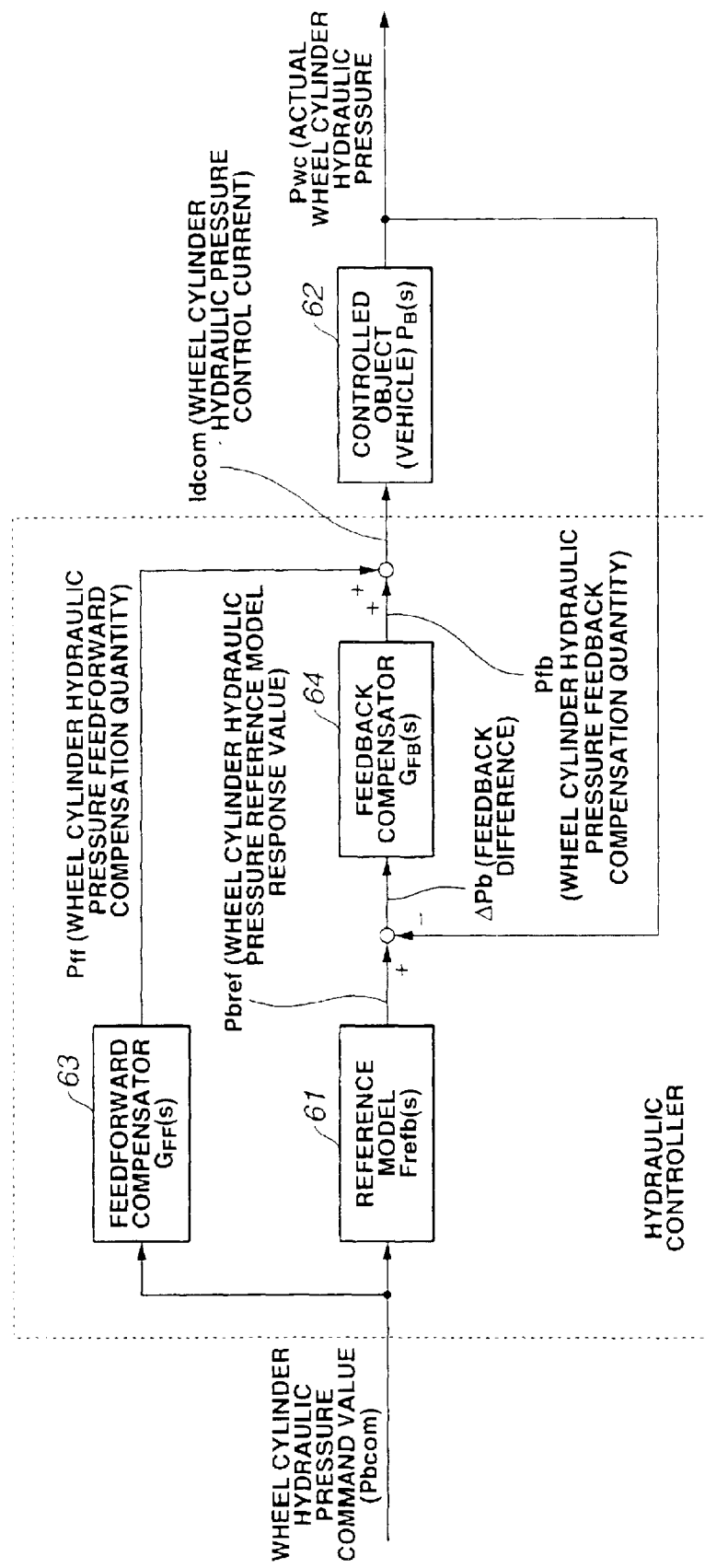
FIG. 9 is a block diagram showing a hydraulic controller for controlling a wheel cylinder hydraulic pressure in the first embodiment of the present invention.
Figure 15A:
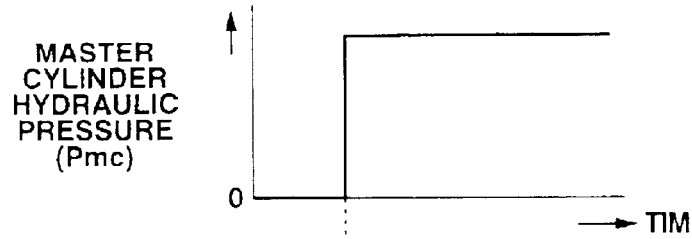
FIGS. 15A through 15F are time charts showing a coordinated control operation of the hybrid brake system shown in FIG. 14B in case that a deceleration feedback control is executed when wheel-cylinder hydraulic control error is generated.
Figure 15B:
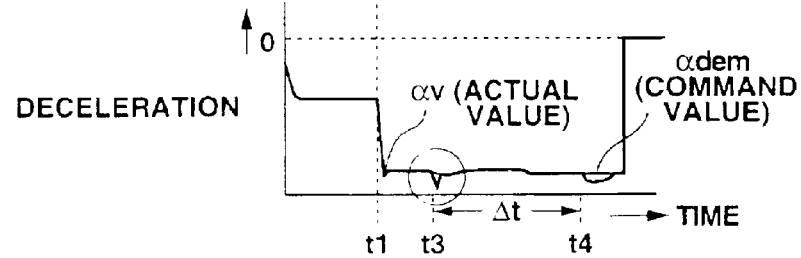
Figure 15C:
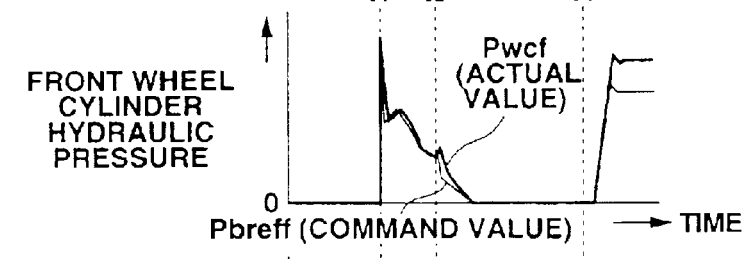
Figure 15D:
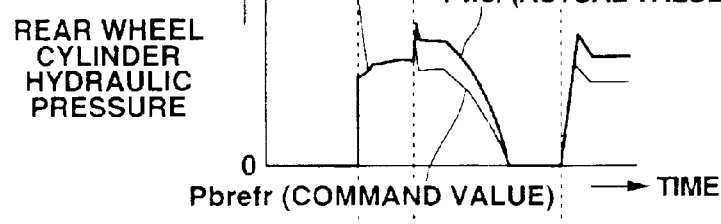
Figure 15E:
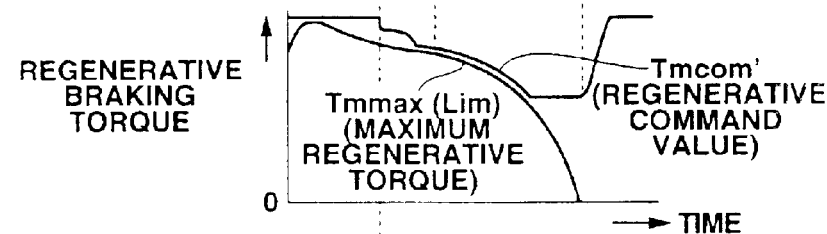
Figure 15F:
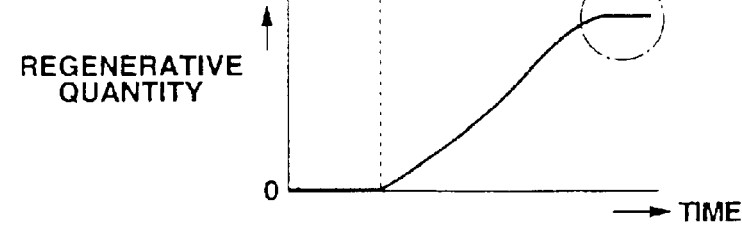
Figure 16A:
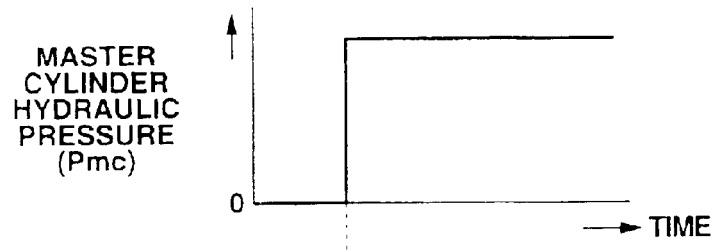
Figure 16C:
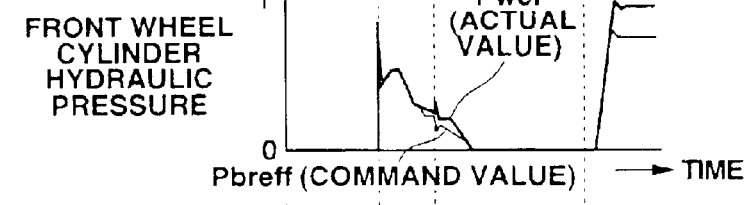
Figure 16D:
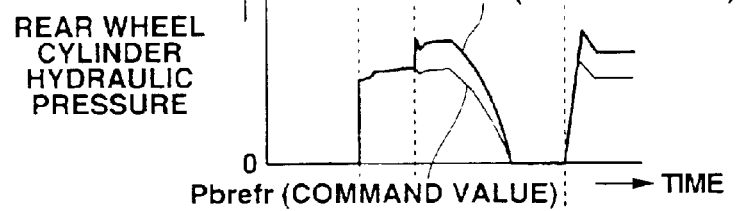
Figure 16E:
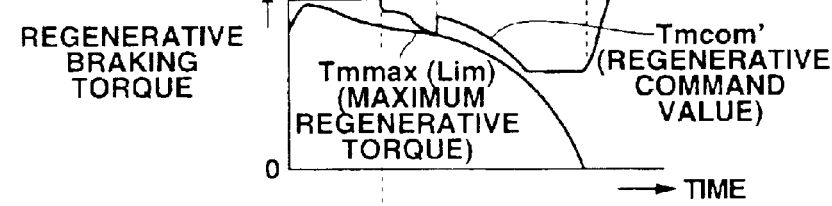

A hydraulic controller for wheel cylinders 2 in the first embodiment according to the present invention is constructed by a two-degree-of-freedom control system, and comprises a hydraulic control reference model 61, a feedforward compensator (phase compensator) 63, and a feedback compensator 64, as shown in FIG. 9. Hydraulic control reference model 61 has a characteristic Frefb(s). Feedforward compensator (phase compensator) 63 performs so as to correspond a response characteristic $P_B(S)$ of a controlled object vehicle (wheel-cylinder hydraulic control system) 62 to characteristic Frefb(s) of reference model 61.

Feedforward compensator 63 calculates a feedforward compensation quantity Pff of the wheel-cylinder hydraulic pressure by filtering wheel-cylinder hydraulic command value Pbcom through a characteristic $G_{FF}(S)$ represented by the following expression (12). Herein, Pbcom is represented as a common of front and rear wheel-cylinder hydraulic command values Pbcomf and Pbcomr.

$$G_{FF}(s)=Frefb(s)/P_B(s) \tag{12}$$

In calculation of feedback compensation quantity Pfb using feedback compensator 64, reference model response value Pbref of the wheel-cylinder hydraulic pressure is first obtained by filtering wheel-cylinder hydraulic command value Pbcom through reference model 61 having a characteristic Frefb(s). Then, wheel-cylinder hydraulic feedback difference ΔPb is obtained by subtracting an actual wheel-cylinder hydraulic pressure Pwc of controlled object (vehicle) 62 from wheel-cylinder hydraulic reference model response value Pbref as represented by the following expression (13).

$$\Delta Pb=Pbref-Pwc \tag{13}$$

Subsequently, wheel-cylinder hydraulic feedback compensation quantity Pfb is obtained by filtering feedback difference ΔPb through a feedback compensator 64 having a characteristic $G_{FB}(s)$ represented by the following expression (14).

$$G_{FB}(s)=(Kp\cdot s+Ki)/s \tag{14}$$

In this embodiment, this characteristic is achieved by a basic PI controller, and therefore control constants $K_P$ and $K_I$ thereof are determined taking account of a gain margin and a phase margin.

Subsequently, a wheel-cylinder hydraulic control current Icom is obtained from the sum of feedforward compensation quantity Pff of wheel-cylinder hydraulic pressure and feedback compensation quantity Pfb, and is outputted as a wheel-cylinder hydraulic control command to controlled object (vehicle) 62.

At step S18 controller 24 calculates front and rear wheel-cylinder hydraulic control errors ΔPbf and ΔPbr from the following expressions. More specifically, controller 24 calculates front wheel-cylinder hydraulic control errors ΔPbf between front wheel-cylinder hydraulic reference model response value Pbreff and front wheel-cylinder hydraulic pressure Pwcf, and rear wheel-cylinder hydraulic control errors ΔPbr between rear wheel-cylinder hydraulic reference model response value Pbrefr and rear wheel-cylinder hydraulic pressure Pwcr. In FIG. 1, actual front and rear wheel-cylinder hydraulic pressures Pwcf and Pwcr are represented as Pwc, and In FIG. 2, control errors ΔPbf and ΔPbr are represented as ΔPb. Step S18 corresponds to hydraulic pressure control error calculating means 36 in FIG. 2.

$$\Delta Pbf=Pbreff-Pwcf$$

$$\Delta Pbr=Pbrefr-Pwcr \tag{15}$$

At step S19 controller 24 converts front and rear wheel-cylinder hydraulic control errors ΔPbf and ΔPbr to the corresponding braking torque ΔTbf and ΔTbr, respectively, using the following expressions (16).

$$\Delta Tbf=-(\Delta Pbf\div K3)$$

$$\Delta Tbr=-(\Delta Pbr\div K3) \tag{16}$$

where K3 is a conversion coefficient based on the vehicle specification previously stored in ROM. Step S19 corresponds to torque converting means 37 in FIG. 2.

At step S20 controller 24 obtains the sum ΔTb of braking torque conversion values ΔTbrf and ΔTbr of the hydraulic control errors from the following expression (17).

$$\Delta Tb=\Delta Tbf+\Delta Tbr \tag{17}$$

Further, controller 24 obtains regenerative braking torque correction quantity ΔTm by compensating the summed braking torque conversion value ΔTb using a phase advance compensation Gph(s) represented by the following expression (18).

$$Gph(s)=(Tm\cdot s+1)/(Tph\cdot s+1) \tag{18}$$

where Tm is a time constant, and Tph is a time constant where Tph<<Tm. Step S20 corresponds to phase advance compensating means 38 in FIG. 2.

Time constant Tm of the response characteristic in the regenerative braking torque control system is processed in motor torque controller 21 so as to be brought to time constant Tbref in reference model 61 of the hydraulic braking torque control system. That is, the reference model employed in this control has a characteristic Frefm as same as the characteristic of the hydraulic braking torque control system. This arrangement is executed in view that when the hydraulic braking torque control system and the regenerative braking torque control system accurately follows the reference model without generating a response error, the total braking torque is always brought (adjusted) to the command value even if the total braking-torque command value or the braking torque distribution is varied.

At step S21 controller 24 obtains corrected regenerative braking-torque command value Tmcom' by correcting regenerative braking-torque command value Tmcom by regenerative braking-torque correction quantity ΔTm as represented by the following expression (19).

$$Tmcom'=Tmcom+\Delta Tm \tag{19}$$

Step S21 corresponds to regenerative braking torque correcting means 39 in FIG. 2.

At step S22 controller 24 outputs corrected regenerative braking-torque command value Tmcom' to motor torque controller 21 and front and rear wheel-cylinder hydraulic command values Pbcomf and Pbcomr to hydraulic brake controller 18.

Motor torque controller 21 controls motor 4 through inverter 22 to bring the actual regenerative torque closer to corrected regenerative braking torque Tmcom'. Hydraulic brake controller 18 controls solenoid values 13, 14 and 16 to bring the actual front and rear hydraulic braking torques closer to front and rear wheel-cylinder hydraulic command values Pbcomf and Pbcomr, respectively.

The hybrid brake system employed in the first embodiment comprises the regenerative braking apparatus which is relatively superior in control responsibility and the hydraulic braking apparatus which is relatively inferior in control responsibility. As shown in FIG. 2, the coordinated brake control system of the hybrid brake system comprises: a total braking torque determining means (total braking force calculating means) 31 which determines total braking force (torque) command value Tdcom according to the vehicle operating condition; a braking torque distributing means (braking force command value distributing means) 33 which distributes the total braking force command value Tdcom to regenerative braking-torque command value Tmcom and the hydraulic braking-torque command value Tbcm; a reference model response value calculating means 35 which calculates a reference model response value Pbre relative to a wheel-cylinder hydraulic pressure (braking force) command value Pbcom, on the basis of a braking force reference model taking account of a delay of the actual hydraulic pressure (actual braking force) at the hydraulic control system relative to the wheel-cylinder hydraulic pressure (braking force) command value Pbcom; and a regenerative braking force command value correcting means 39 which corrects the regenerative braking-torque command value Tmcom according to the braking force control error ΔPb (ΔTm) between the actual braking force estimated value Pwc and the reference model response value Pbref; wherein the corrected regenerative braking-torque command value Tmcom' is employed in the control of the regenerative brake apparatus.

With this arrangement according to the first embodiment of the present invention, in the correction of regenerative braking-torque command value Tmcom for the regenerative brake apparatus performing a high control responsibility, regenerative braking-torque command torque Tmcom is corrected only by ΔTm which varies according to the braking force control error ΔPb between the actual braking force estimated value (actual braking force estimated value Pwc) relating to the hydraulic brake apparatus and the braking force command value (reference model response value Pbref) relating to the hydraulic braking apparatus.

Accordingly, it becomes possible to prevent the excessive correction which has been executed in the case that the braking force command value of the high-responsibility brake apparatus is corrected on the basis of a difference between a command value and an actual value of the low-responsibility brake apparatus as in a related coordinated braking control system. This solves a problem that the total braking force actual value largely deviates from the total braking force command value due to the execution of such an excessive correction.

More specifically, by setting the basic distribution to the hydraulic braking torque and the regenerative braking torque so as to bring the total braking torque actual value closer to the total braking-torque command value when the wheel-cylinder hydraulic pressure is accurately controlled according to the reference model response of the hydraulic control system, even if a difference is generated between the wheel-cylinder hydraulic pressure actual value and the reference model response value of the wheel-cylinder hydraulic pressure is generated by a large response delay, an overshoot or a stationary difference, the difference is covered with the regenerative braking torque. Therefore, it is possible to bring the total braking torque actual value closer to the total braking-torque command value. This advantage is also achieved in case that a braking operation quantity generated by a driver is varied, or in case that the distribution of the regenerative braking torque and the hydraulic braking torque is varied according to the vehicle operating condition.

Referring FIGS. 10A through 13F, there are discussed the advantages of the coordinated brake control system according to the first embodiment of the present invention.

FIGS. 10A through 10F are time charts showing a simulation result in case that wheel-cylinder hydraulic control error ΔPb (braking force control error) is around zero during the control after master-cylinder hydraulic pressure Pmc is raised up at moment t1.

FIGS. 11A through 11F are time charts showing a simulation result in case that the correction of the regenerative braking-torque command value by regenerative braking torque correcting means 39 shown in FIG. 2 and the phase advance compensation by phase advance compensating means 38 in FIG. 2 are not executed even when wheel-cylinder hydraulic control error ΔPb (braking force control error) is generated at moment t3 during the control after master-cylinder hydraulic pressure Pmc is raised up at moment t1.

FIGS. 12A through 12F are time charts showing a simulation result in case that the correction of the regenerative braking-torque command value by regenerative braking torque correcting means 39 shown in FIG. 2 is executed, and the phase advance compensation by phase advance compensating means 38 in FIG. 2 is not executed when wheel-cylinder hydraulic control error ΔPb (braking force control error) is generated at moment t3 during the control after master-cylinder hydraulic pressure Pmc is raised up at moment t1.

FIGS. 13A through 13F are time charts showing a simulation result in case that both of the correction of the regenerative braking-torque command value by regenerative braking torque correcting means 39 shown in FIG. 2 and the phase advance compensation by phase advance compensating means 38 in FIG. 2 are executed when wheel-cylinder hydraulic control error ΔPb (braking force control error) is generated at moment t3 during the control after master-cylinder hydraulic pressure Pmc is raised up at moment t1.

The simulations shown in FIGS. 10A though 13F were executed under the same condition. The condition is that the same constant-force baking from a predetermined vehicle speed is executed, that the regenerative coordinating brake control is started just after a moment t1 when a brake pedal is depressed, that during a low-speed traveling after moment t2 at when vehicle speed VSP is lowered to a set vehicle speed, the regenerative braking torque is gradually decreased as vehicle speed VSP is lowered and the wheel-cylinder hydraulic pressures of the front wheels or rear wheels are increased by the decreased quantity of the regenerative braking torque so as to correspond the total braking torque to the total braking-torque command value, and that the regenerative coordinated braking control is stopped just before the vehicle stops. Further, as discussed above, the total braking-torque command value is corrected so as to eliminate the influence of the disturbance by employing the deceleration feedback control in the first embodiment.

When the hydraulic control system idealistically functions, the vehicle deceleration (a deceleration of the driving wheels) is controlled at a constant value in response to the depression condition of the brake pedal as shown in FIGS. 10A through 10F, particularly in FIG. 10B. The time charts in FIGS. 10A through 10F are compared with the time charts in FIGS. 11A through 13F in view of the operation at the time when hydraulic control error ΔPb (braking force control error) is generated.

FIGS. 11A through 13F basically show a case that the actual value of the front wheel-cylinder hydraulic pressure is momentarily and largely lowered relative to the command value due to the generation of a trouble in the front wheel brake hydraulic control system at moment t3 in a transient period after moment t2.

If neither the correction of the regenerative braking-torque command value through means 39 nor the phase advance compensation through means 38 is executed under the above-explained case as is the case represented by FIGS. 11A through 11F, the control depends on only the feedback deceleration. Therefore, the compensation control cannot follow the actual change due to the response speed of the deceleration feedback control, and the deceleration of the driving wheel (front wheel) is momentarily and largely decreased in magnitude as shown in FIG. 11B. The reason thereof is that the error of the wheel cylinder 2 has a relatively large time lag in actually generating the driving wheel deceleration.

FIGS. 12A through 12F show time charts in case that corrected regenerative braking-torque command value Tmcom' is varied by executing the correction of the regenerative braking-torque command value using the means 39 in FIG. 2, even if the front wheel brake hydraulic control system is put in a trouble state at moment t3.

At moment t3 when the actual value of the front wheel-cylinder hydraulic pressure is momentarily and largely lowered due to the trouble of the front wheel braking hydraulic control system, the hydraulic control error is rapidly compensated by the corrected regenerative braking-torque command value by converting the control error between the actual value and the command value into a error-correction torque and by adding the error-correction torque to the regenerative braking-torque command value. Therefore, it becomes possible to largely suppress the fluctuation of the driving wheel deceleration at moment t3, as compared with the case in FIGS. 11A through 11F.

FIGS. 13A through 13F show time charts in case that corrected regenerative braking-torque command value Tmcom' is varied by executing the correction of the regenerative braking-torque command value using the means 39 in FIG. 2 and that the phase advance compensation is executed using the means 38 in FIG. 3, even if the front wheel brake hydraulic control system is put in a trouble state at moment t3.

In this case of executing both of the correction of the regenerative braking-torque command value and the phase advance compensation, the phase advance compensation functions to extremely decrease the delay of the regenerative braking torque control system relative to the command value. Therefore, the influence of the wheel-cylinder hydraulic pressure control error to the total braking torque is compensated by correcting the regenerative braking torque as possible, and consequently it becomes possible to further largely suppress the fluctuation of the driving wheel deceleration at moment t3, as compared with the case shown in FIGS. 12A through 12F.

Furthermore, the first embodiment according to the present invention is arranged such that the regenerative braking-torque command value is determined within maximum braking torque limit value Tmmax(Lim) obtained by limiting the allowable maximum regenerative braking torque Tmmax by the predetermined value with reference to the relationship shown in FIG. 7, at step S14 before the total braking-torque command value is distributed into regenerative braking-torque command value Tmcom and hydraulic braking-torque command value Tbcom at step S15. Therefore, it becomes possible to ensure a margin for correcting regenerative braking-torque command value Tmcom based on the wheel-cylinder hydraulic control error, and the advantage by this correction of regenerative braking-torque command value Tmcom is firmly ensured.

Further, the first embodiment according to the present invention is arranged such that the regenerative brake apparatus is employed as a high-response baking means and a friction type brake apparatus is employed as a low-response braking means, and that the coordinated brake control system is adapted to the hybrid brake system which is a combination of the regenerative brake apparatus and the friction type brake apparatus. Therefore, even if the friction type brake apparatus having a low-control-responsibility generates a transient control error, the regenerative brake apparatus having a high-control-responsibility covers the shortage of the braking torque generated by the control error, and consequently the total braking-torque command value is achieved. Therefore, it becomes possible to prevent the driver from having the strange feeling during the brake-pedal operating period.

Although the first embodiment according to the present invention has been shown and described such that the friction type brake apparatus is employed as the hydraulic brake apparatus, it may not be limited to this, and there may be employed an electromotive brake system of pressing friction elements to a rotating disc or drum using an electric motor.

Figure 17A:
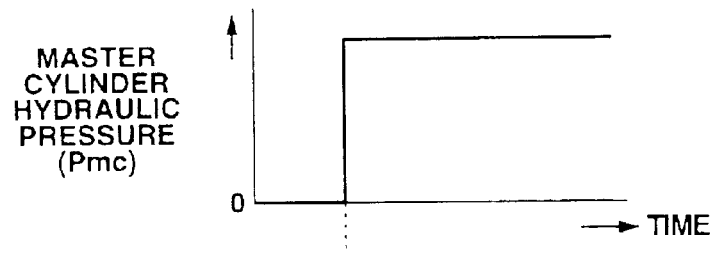
FIGS. 17A through 17F are time charts showing a coordinated control operation of the hybrid brake system shown in FIG. 14B in case that the deceleration feedback control, the correction of the regenerative braking-torque command using a high-frequency component of the hydraulic control error, and the phase advance compensation are executed when wheel-cylinder hydraulic control error is generated.
Figure 17B:
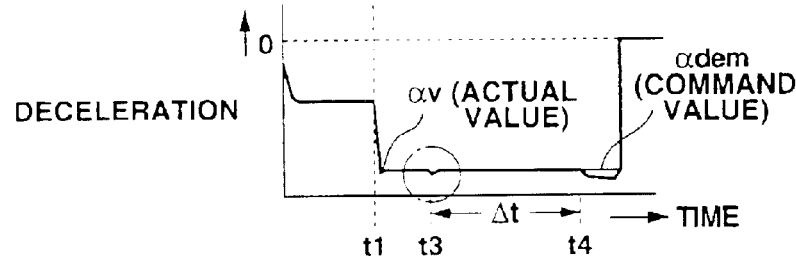
Figure 17C:
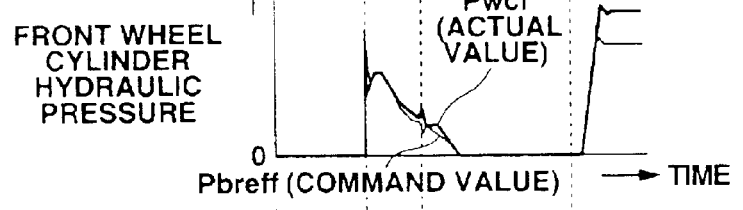
Figure 17D:
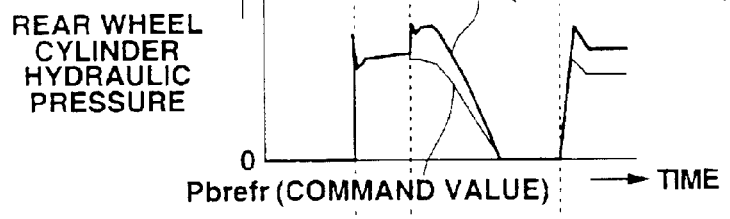
Figure 17E:
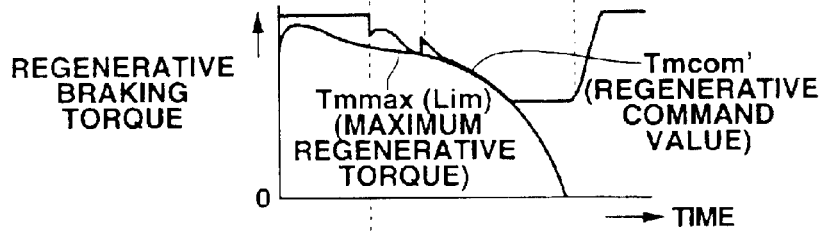
Figure 17F:
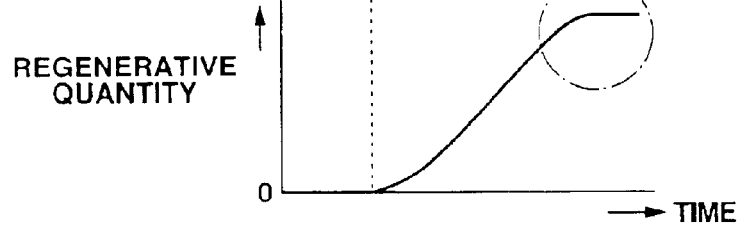

Referring to FIGS. 14A and 17F, there is discussed a second embodiment of the coordinated brake control system according to the present invention. The basis construction of the second embodiment is basically the same as that of the first embodiment shown in FIG. 1.

The second embodiment is specifically arranged as shown in FIG. 14B such that a high-frequency component extracting means 40 is newly added between the means 37 and 38 of FIG. 2. A flowchart of FIG. 14A newly includes steps S20a and S20b instead of step S20 of the flowchart in FIG. 3. The other steps of the flowchart executed in the second embodiment are basically the same as steps shown in FIG. 3, and therefore the explanation of the other steps is omitted herein. The second embodiment is specifically arranged as shown in FIG. 14B such that a high-frequency component extracting means 40 is newly added between the means 37 and 38 of FIG. 2. As to steps S20a and S20b, the explanation is made as follows.

At step S20a in FIG. 14A subsequent to the execution of step S19, controller 24 extracts a high-frequency component from a total control-error torque conversion value ΔTb (ΔTb=ΔTbf+ΔTbr) of the hydraulic control error by filtering total control-error torque conversion value ΔTb (ΔTb= ΔTbf+ΔTbr) through a bypass filter Ghpf(s) represented by the following expression (20).

$$Ghpf(s)=Thpf \cdot s/(Thpf \cdot s+1) \tag{20}$$

where Thpf is a time constant. Therefore, step S20a corresponds to high-frequency component extracting means 40 in FIG. 14B.

At step S20b subsequent to the execution of step S20a, controller 24 calculates regenerative braking torque correction value ΔTm by compensating the high-frequency component of total control-error torque conversion value ΔTb of the hydraulic control error using a phase advance compensator Gph(s) represented by the expression (20). Therefore, step S20B corresponds to a high-frequency component extracting means 40 of FIG. 14B. After the execution of step S20b, the program proceeds to step S21.

With the thus arranged second embodiment according to the present invention, total braking-torque command value Tdcom is determined by the deceleration feedback control so as to bring the actual deceleration $\alpha_V$ closer to target deceleration $\alpha_{dem}$ according to the vehicle operating condition.

The high-frequency component of total control-error torque conversion value ΔTb of the hydraulic control error is obtained by filtering total control-error torque conversion value ΔTb through the bypass filter, and is employed in the correction of the regenerative braking torque without directly employing of total control-error torque conversion value ΔTb. Therefore, the coordinated brake control system of the second embodiment according to the present invention also ensures the following advantages.

The second embodiment according to the present invention is arranged such that the regenerative braking torque is corrected so as to be decreased when front and rear wheel-cylinder hydraulic control errors ΔPbf and ΔPbr (ΔPb in FIG. 2) are generated such that front and rear wheel-cylinder hydraulic pressures Pwcf and Pwcr (Pwc in FIG. 1) detected by sensor 20 becomes greater than front and rear wheel-cylinder hydraulic reference model response values Pbreff and Pbrefr obtained at step S17.

Further, the second embodiment is arranged to employ only the high-frequency component of total control-error torque conversion value ΔTb in the correction of the regenerative braking torque, and therefore the correction is executed during a transient period where front and rear wheel-cylinder hydraulic control errors ΔPbf and ΔPbr are varying, and is not executed during a steady state where front and rear wheel-cylinder hydraulic control errors ΔPbf and ΔPbr are stable. This arrangement of the second embodiment according to the present invention therefore prevents the lowering correction of the regenerative braking torque from being continuously and excessively executed even when front and rear wheel-cylinder hydraulic control errors ΔPbf and ΔPbr are stable. Consequently, it becomes possible to avoid a detrimental effect of lowering the energy efficiency.

Referring to FIGS. 15A through 17F, there are discussed the advantages of the second embodiment according to the present invention. FIGS. 15A through 17F show time charts in case that although master-cylinder hydraulic pressure Pmc is increased stepwise at a moment t1, front and rear wheel-cylinder actual hydraulic pressures Pwcf and Pwcr become steadily larger than front and rear wheel-cylinder hydraulic reference model response values Pbreff and Pbrefr, respectively, due to the trouble of the front and rear wheel brake system at a moment t3.

More specifically, FIGS. 15A through 15F show time charts in case that only the deceleration feedback control is executed. In other words, only the deceleration feedback control is executed when wheel-cylinder hydraulic control error ΔPb (braking force control error) is generated at moment t3 during the control after master-cylinder hydraulic pressure Pmc is raised up at moment t1.

FIGS. 16A through 16F show time charts in case that the regenerative braking torque is corrected by the hydraulic control error in addition to the execution of the deceleration feedback control. That is, the deceleration feedback control and the phase-advance compensation are executed when wheel-cylinder hydraulic control error ΔPb (braking force control error) is generated at moment t3 during the control after master-cylinder hydraulic pressure Pmc is raised up at moment t1, in this case.

Further, FIGS. 17A through 17F show time charts in case that the regenerative braking torque is corrected only by the high-frequency component of the hydraulic control error according to the embodiment of the present invention. That is, the deceleration feedback control, the phase-advance compensation and the high-pass filtering process of the hydraulic control error are executed when wheel-cylinder hydraulic control error ΔPb (braking force control error) is generated at moment t3 during the control after master-cylinder hydraulic pressure Pmc is raised up at moment t1, in this case.

When only the deceleration feedback control is executed, the actual deceleration $\alpha_V$ largely fluctuates at moment t3 as shown in FIGS. 15A through 15F. Therefore, this fluctuation is converged to the command value $\alpha_{dem}$ by executing the deceleration feedback control.

When the regenerative braking torque is corrected by the hydraulic control error in addition to the execution of the deceleration feedback control, the fluctuation of the actual deceleration αV is momentarily decreased at moment t3, and this correction of the regenerative torque continuously decreases the absolute value of the regenerative braking torque after moment t3, as shown in FIGS. 16A through 16F. Therefore, as is apparent from the comparison with the case of FIGS. 15A through 15F in regenerative quantity, the energy efficiency is lowered.

When the regenerative braking torque is corrected only by the high-frequency component of the hydraulic control error according to the embodiment of the present invention, the fluctuation of the actual deceleration $\alpha_V$ at moment t3 is decreased by this correction as shown in FIGS. 17A through 17F. Further, since this correction using the high-frequency component is executed only during the transient state just after moment t3, the absolute value of the regenerative braking torque is quickly converged to the maximum regenerative braking torque Tmmax(Lim) so as to obtain the regenerative quantity which is generally the same as that of FIG. 15F. Therefore it becomes possible to prevent the lowering of the energy efficiency.

Further, even if the deceleration is again fluctuated by not executing the correction of the regenerative braking torque under the steady state, such a correction under the steady state is sufficiently corrected by the deceleration feedback control. This is easily understood from the phenomenon that during a period Δt from the starting moment t3 of the correction of the deceleration fluctuation to a starting moment t4 of the limiting of the regenerative braking torque, the fluctuation of the deceleration does not generate a large difference.

Finally, since each of the embodiments of the present invention is arranged to correct the regenerative braking torque by a feedforward method based on the hydraulic control error, there is caused no interference between the deceleration feedback control and the feedforward control, even if this feedforward method is employed with the deceleration feedback control.

This application is based on prior Japanese Patent Applications Nos. 2003-57299 and 2002-268794. The entire contents of the Japanese Patent Applications No. 2003-57299 with a filing date of Mar. 4, 2003 and No. 2002-268794 with a filing date of Sep. 13, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A coordinated brake control system for a hybrid brake system of a vehicle, comprising:
   a vehicle operating condition detector detecting a vehicle operating condition of the vehicle;
   a first brake generating a first braking torque according to a first braking torque command value;
   a second brake generating a second braking torque according to a second braking torque command value, a control responsibility of the first brake being higher than a control responsibility of the second braking torque; and a controller connected to the vehicle operating condition detector, the first brake and the second brake, the controller being arranged, to determine a total braking torque command value according to the vehicle operating condition, to distribute the total braking torque command value into the first braking torque command value and the second braking torque command value, to estimate the second braking torque, to calculate a reference model response value relative to the second braking torque command value on the basis of a braking torque reference model which is determined upon taking account of a delay of the second braking torque relative to the second braking torque command value, and to correct the first braking torque command value according to a braking torque difference between the estimated second braking torque and the reference model response value.

2. The coordinated brake control system as claimed in claim 1, wherein the first braking torque command value is corrected by a response delay quantity relative to the braking torque command value in such a manner as to execute a phase advance compensation of the braking torque difference when the first braking torque command value is corrected according to the braking torque difference.

3. The coordinated brake control system as claimed in claim 1, wherein the controller is further arranged to determine the total braking torque command value by executing a deceleration feedback control so as to bring an actual deceleration to a target deceleration according to the vehicle operating condition, and to correct the first braking torque command value using only a high-frequency component of the braking torque difference as the braking torque difference.

4. The coordinated brake control system as claimed in claim 1, wherein the controller is further arranged to determine the first braking torque command value by limiting within a limited value obtained by subtracting a predetermined quantity from an allowable (generable) maximum braking torque when the controller distributes the total braking torque command value into the first braking torque command value and the second braking torque command value.

5. The coordinated brake control system as claimed in claim 1, wherein the first brake includes a regenerative brake apparatus, and the second brake includes a friction type brake apparatus.

6. The coordinated brake control system as claimed in claim 1, wherein the second brake includes a hydraulic brake apparatus having a brake generating the second braking force according to a wheel cylinder hydraulic pressure, the braking torque reference model being employed when the wheel cylinder hydraulic pressure is feedback controlled.

7. The coordinated brake control system as claimed in claimed 1, wherein the controller is connected to the first brake through a motor torque controller and to the second brake through a hydraulic brake controller.

8. The coordinated brake control system as claimed in claimed 7, wherein a time constant of a response characteristic in the first brake is processed in the motor torque controller so as to be brought to a time constant in a reference model of the second brake.

9. The coordinated brake control system as claimed in claim 1, wherein the first brake includes a hydraulic brake apparatus adapted to four wheels of the vehicle, the first braking torque being controlled by controlling a wheel cylinder hydraulic pressure applied to the hydraulic brake apparatus, the reference model response value corresponding to a difference between the wheel cylinder hydraulic pressure and a response value of a wheel cylinder hydraulic pressure reference model.

10. A coordinated brake control system comprising:

vehicle operating condition detecting means for detecting a vehicle operating condition of a vehicle;

first braking means for generating a first braking torque actual value according to a first braking torque command value;

second braking means for generating a second braking torque actual value according to a second braking torque command value, second braking torque;

total braking force calculating means for determining a total braking torque command value according to the vehicle operating condition;

braking torque distributing means for distributing the total braking torque command value into the first braking torque command value and the second braking torque command value;

actual braking force estimating means for estimating an estimated second braking torque actual value of the second brake;

reference model response calculating means for calculating a reference model response value relative to the second braking torque command value on the basis of the braking torque reference model which is determined upon taking account of a delay of the second braking torque actual value relative to the second braking torque command value; and command braking force correcting means for correcting the first braking torque command value according to a braking torque difference between the estimated second braking torque actual value and the reference model response value.

11. A method of controlling a hybrid brake system of a vehicle, the hybrid brake comprising a first brake and a second brake whose control responsibility is not higher than a control responsibility of the first brake, the method comprising:

detecting a vehicle operating condition of the vehicle;

determining a total braking torque command value according to the vehicle operating condition;

distributing the total braking torque command value into a first braking torque command value according which the first brake generates a first braking torque and a second braking torque command value according which the second brake generates a second braking torque;

estimating the second braking torque;

calculating a reference model response value relative to the second braking torque command value on the basis of a braking torque reference model which is determined upon taking account of a delay of the second braking torque relative to the second braking torque command value; and correcting the first braking torque command value according to a braking torque difference between the estimated second braking torque and the reference model response value.

* * * * *